R. VON REPPERT.
CALCULATING MACHINE.
APPLICATION FILED DEC. 18, 1917.

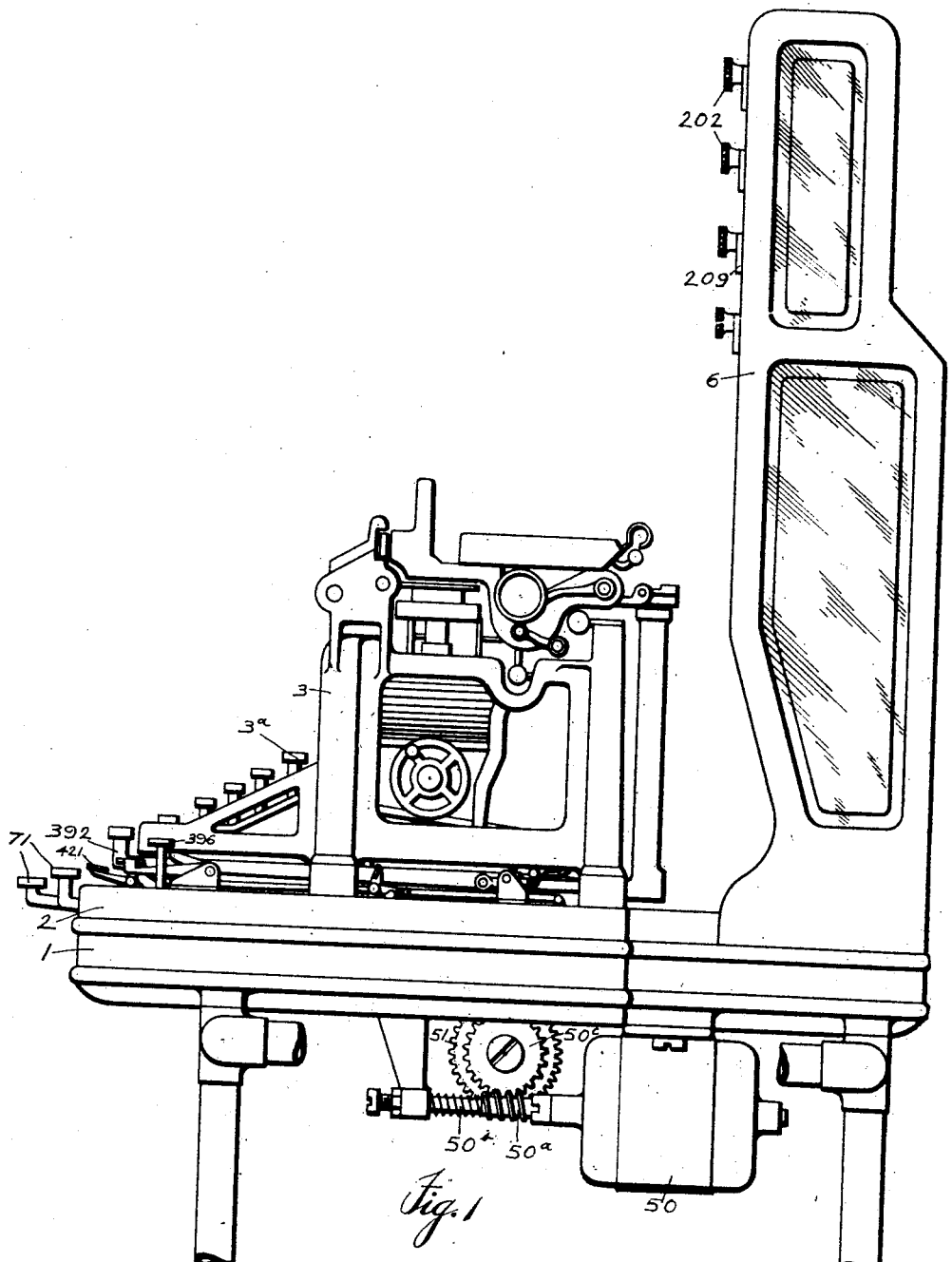

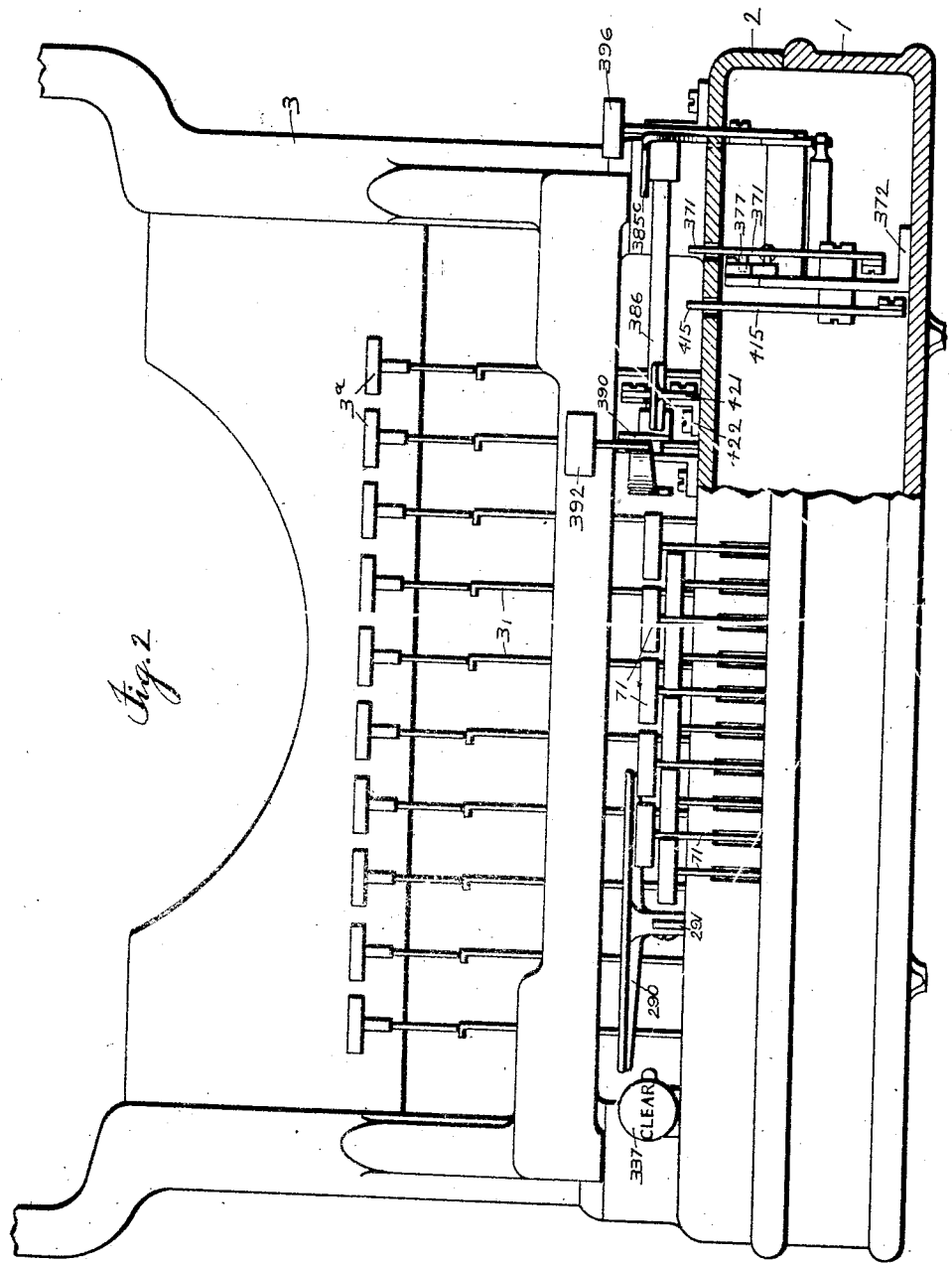

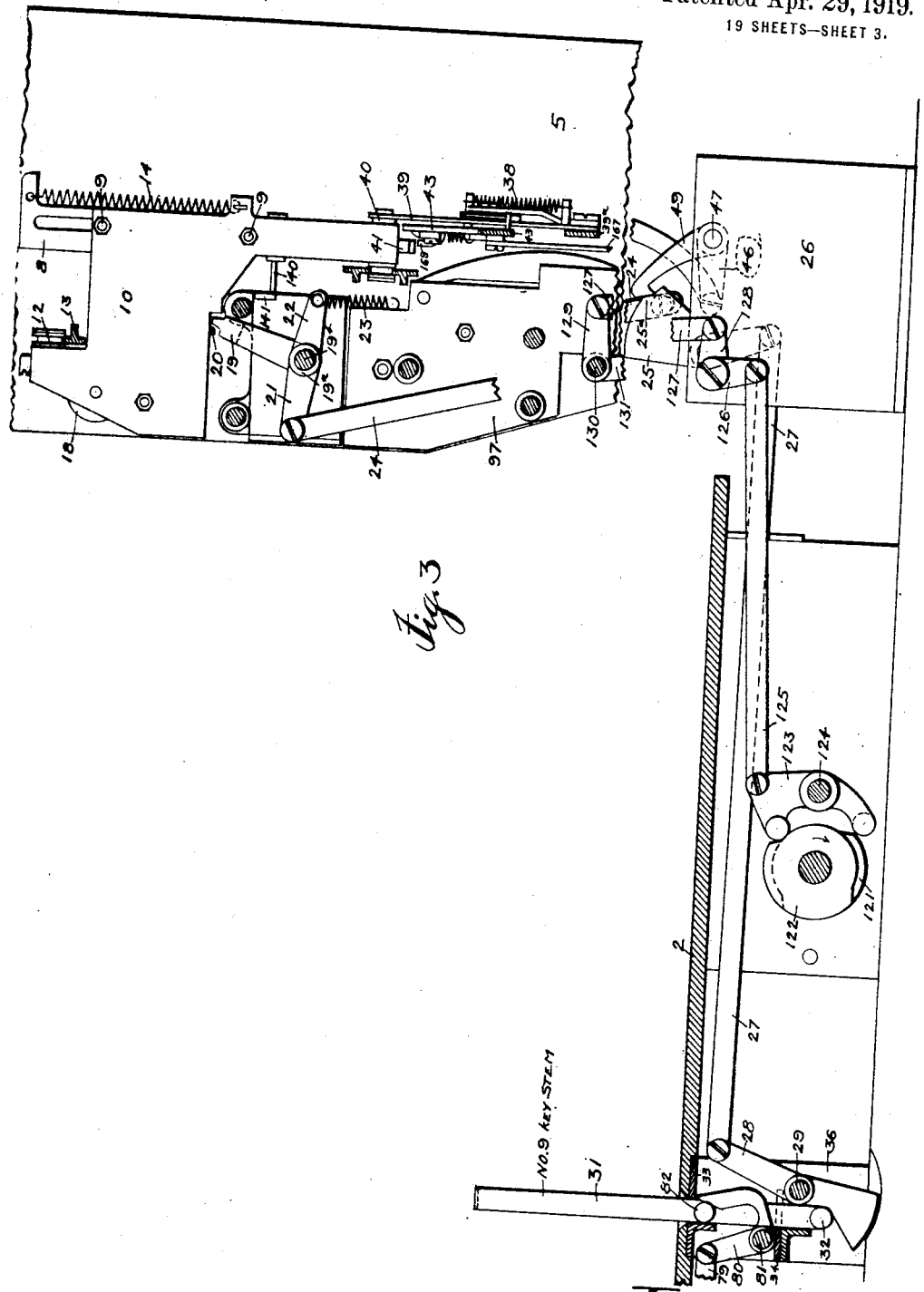

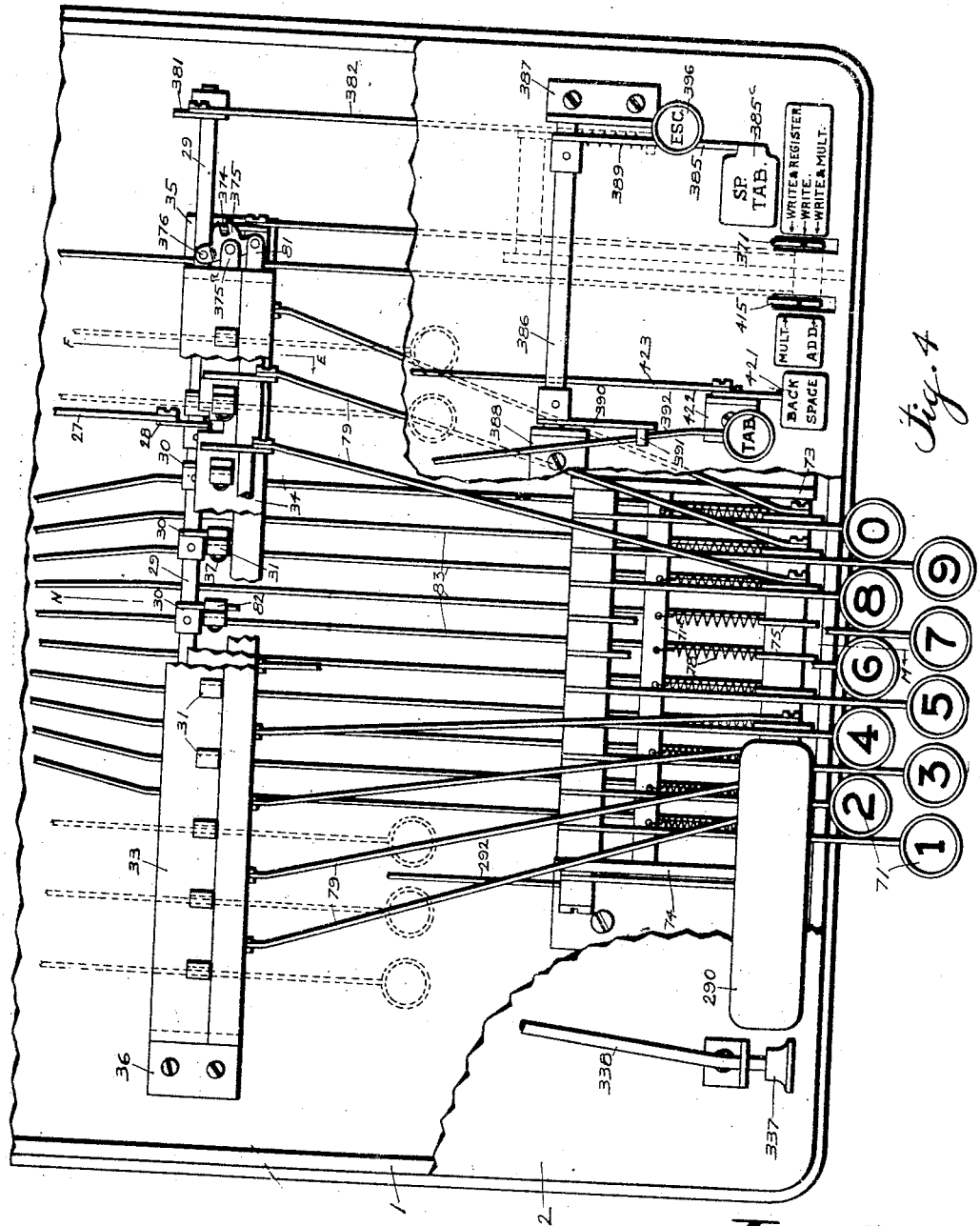

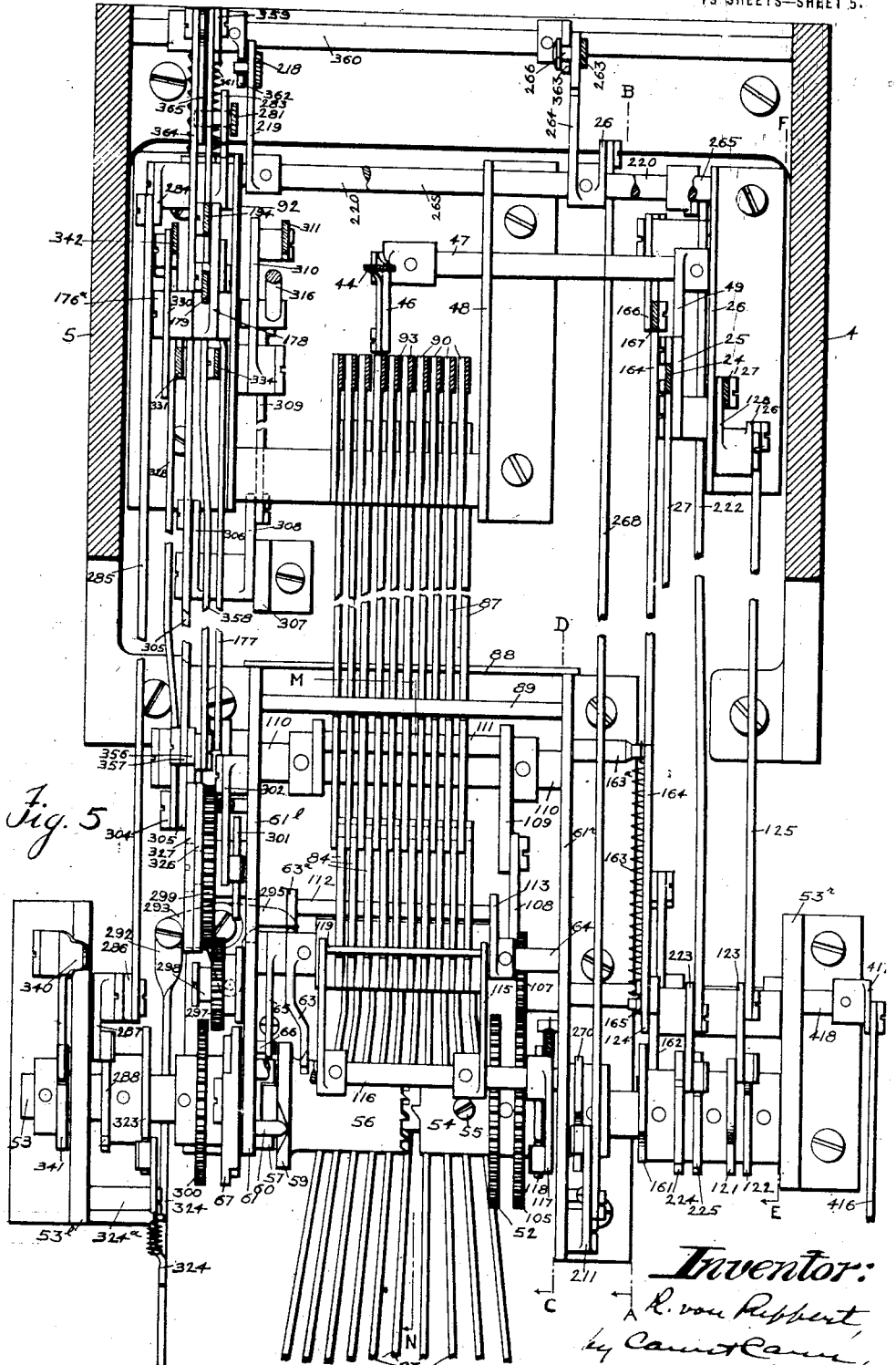

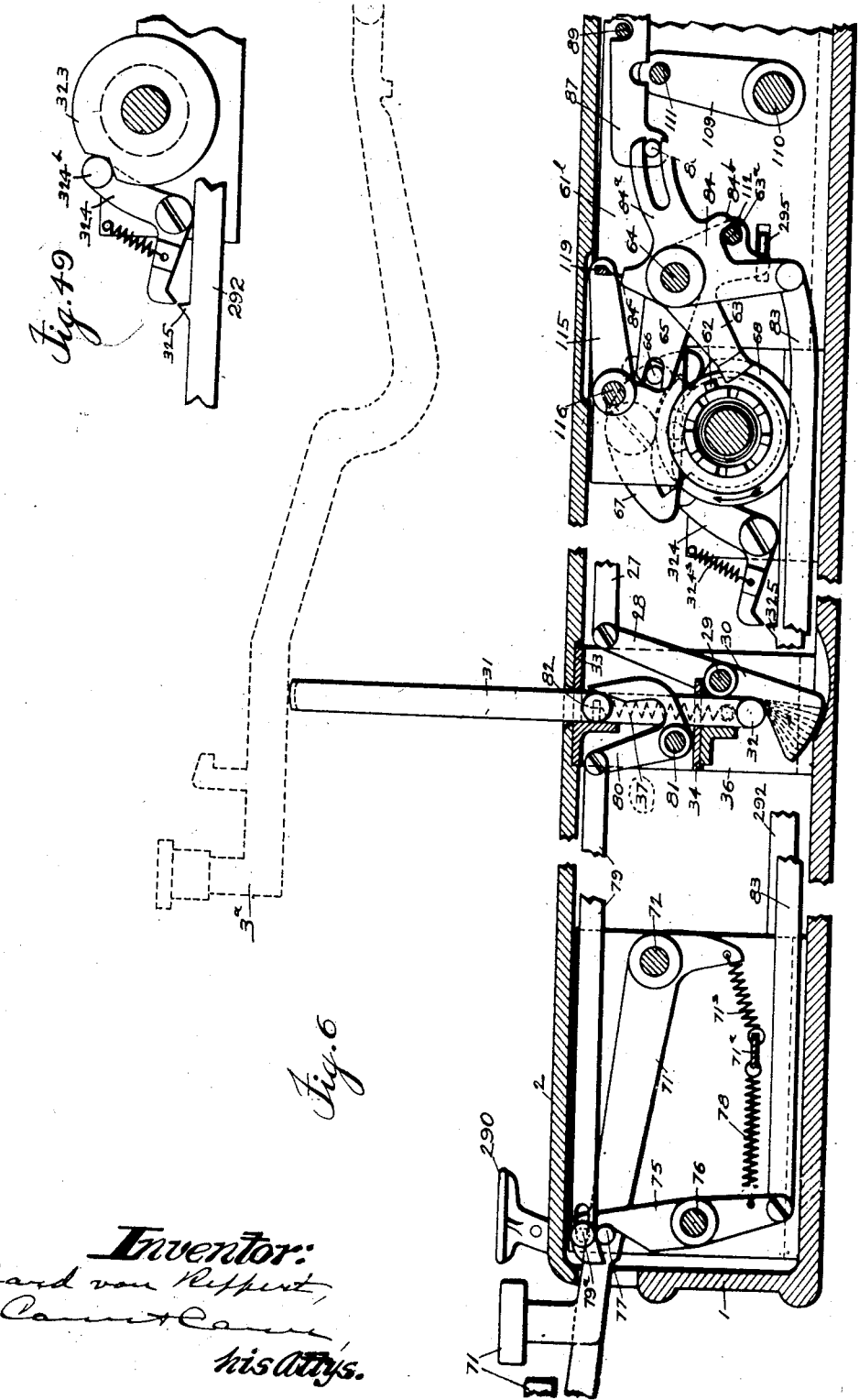

1,302,250.

Patented Apr. 29, 1919.

Inventor.
Richard von Reppert
his Attys.

R. VON REPPERT.
CALCULATING MACHINE.
APPLICATION FILED DEC. 18, 1917.

1,302,250.

Patented Apr. 29, 1919.
19 SHEETS—SHEET 10.

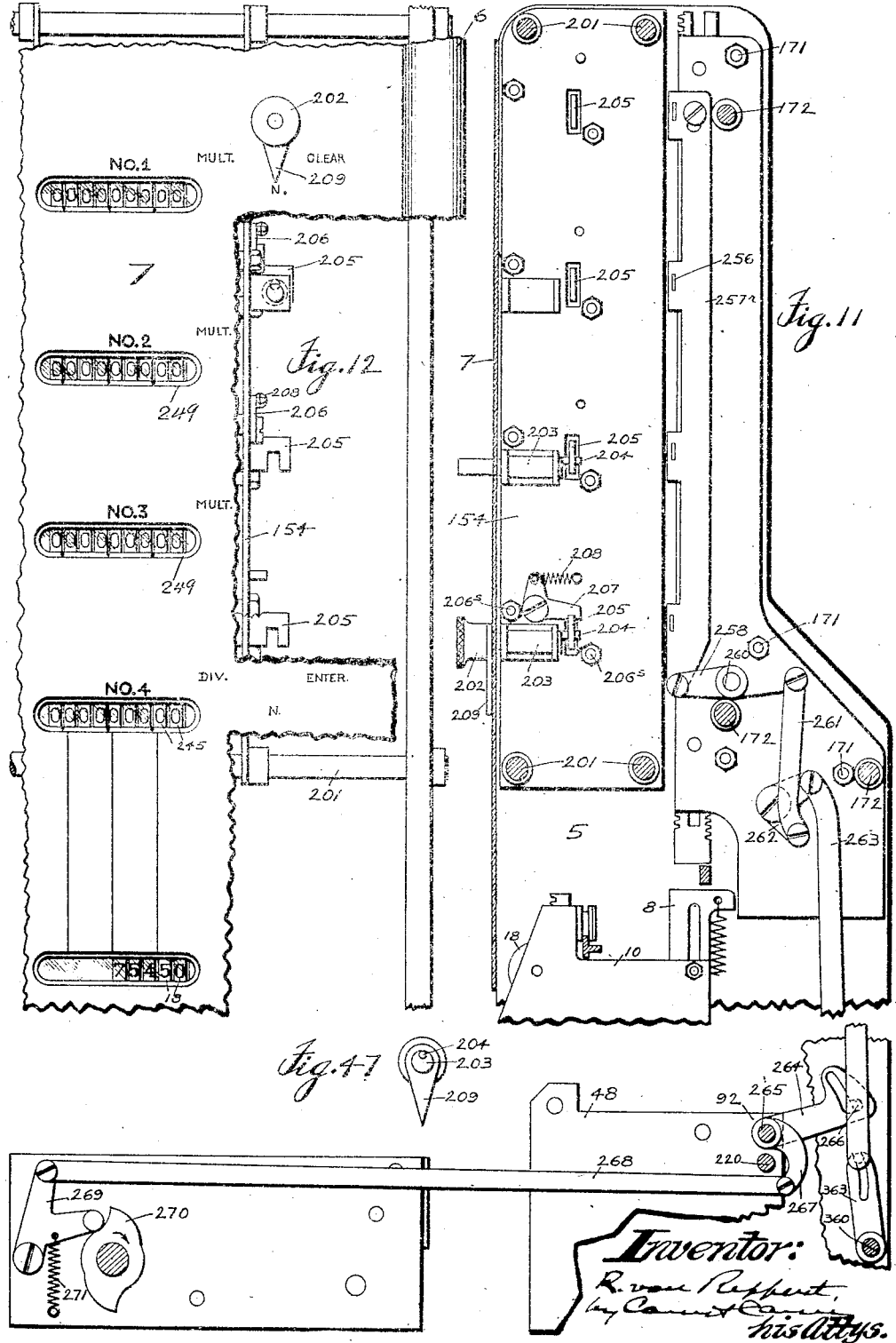

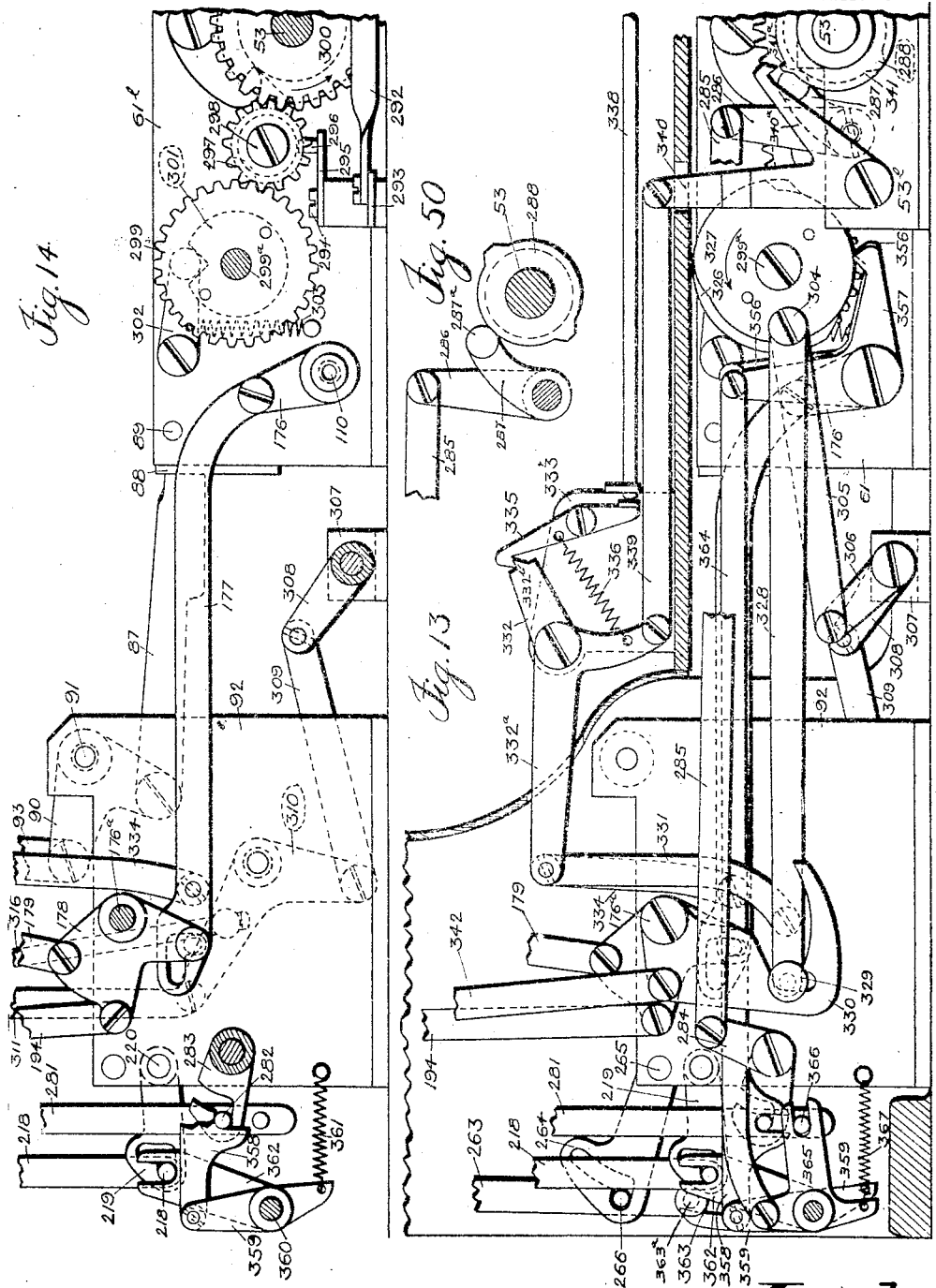

R. VON REPPERT.
CALCULATING MACHINE.
APPLICATION FILED DEC. 18, 1917.

1,302,250.

Patented Apr. 29, 1919.
19 SHEETS—SHEET 13.

Inventor:
Richard von Reppert,
by Carr & Carr
his Attys.

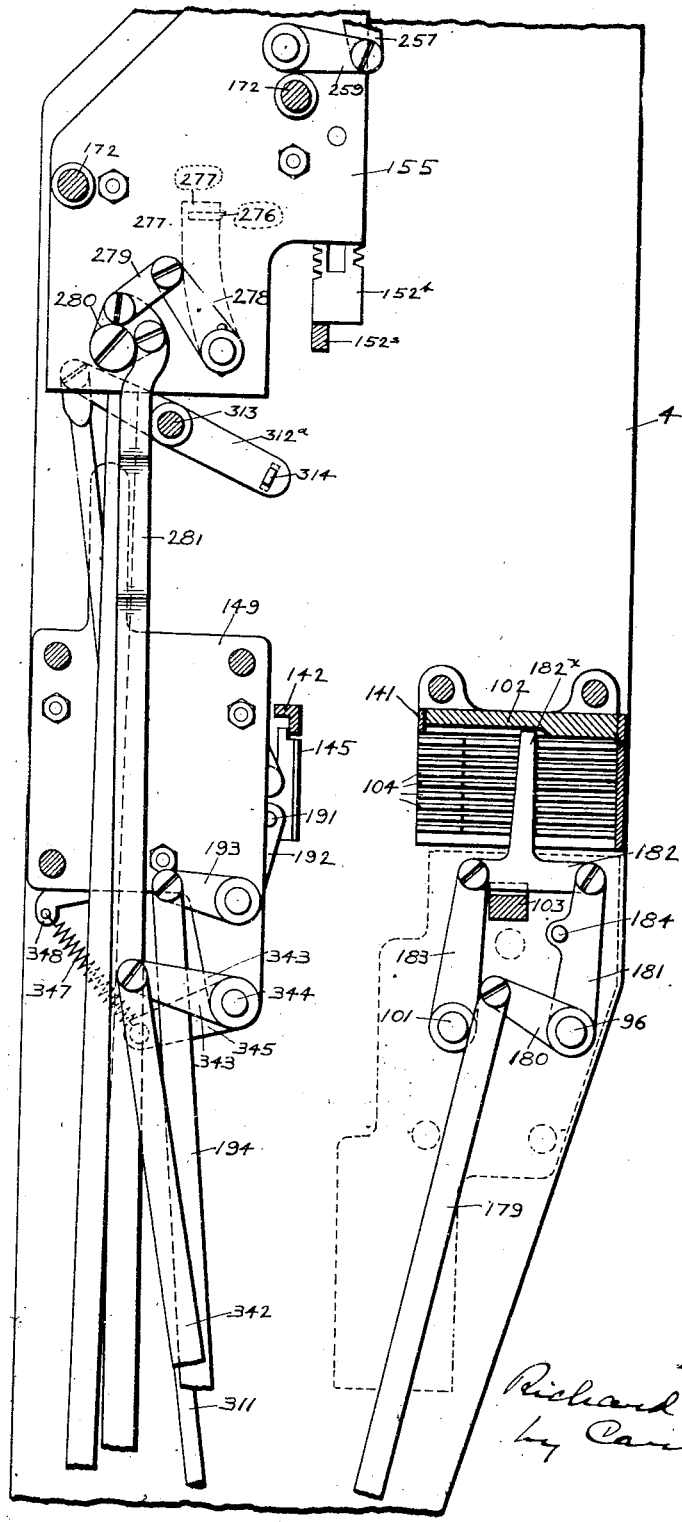

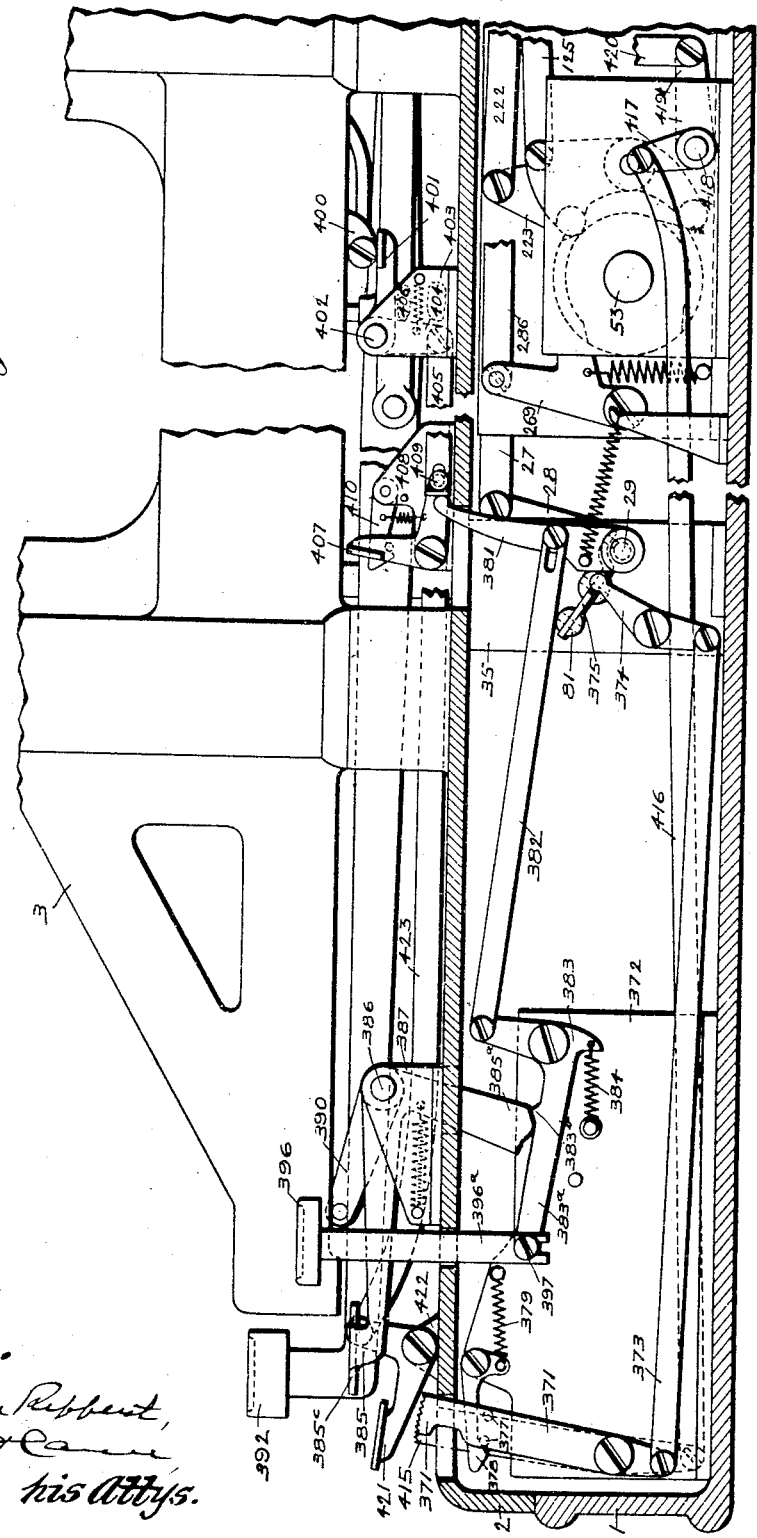

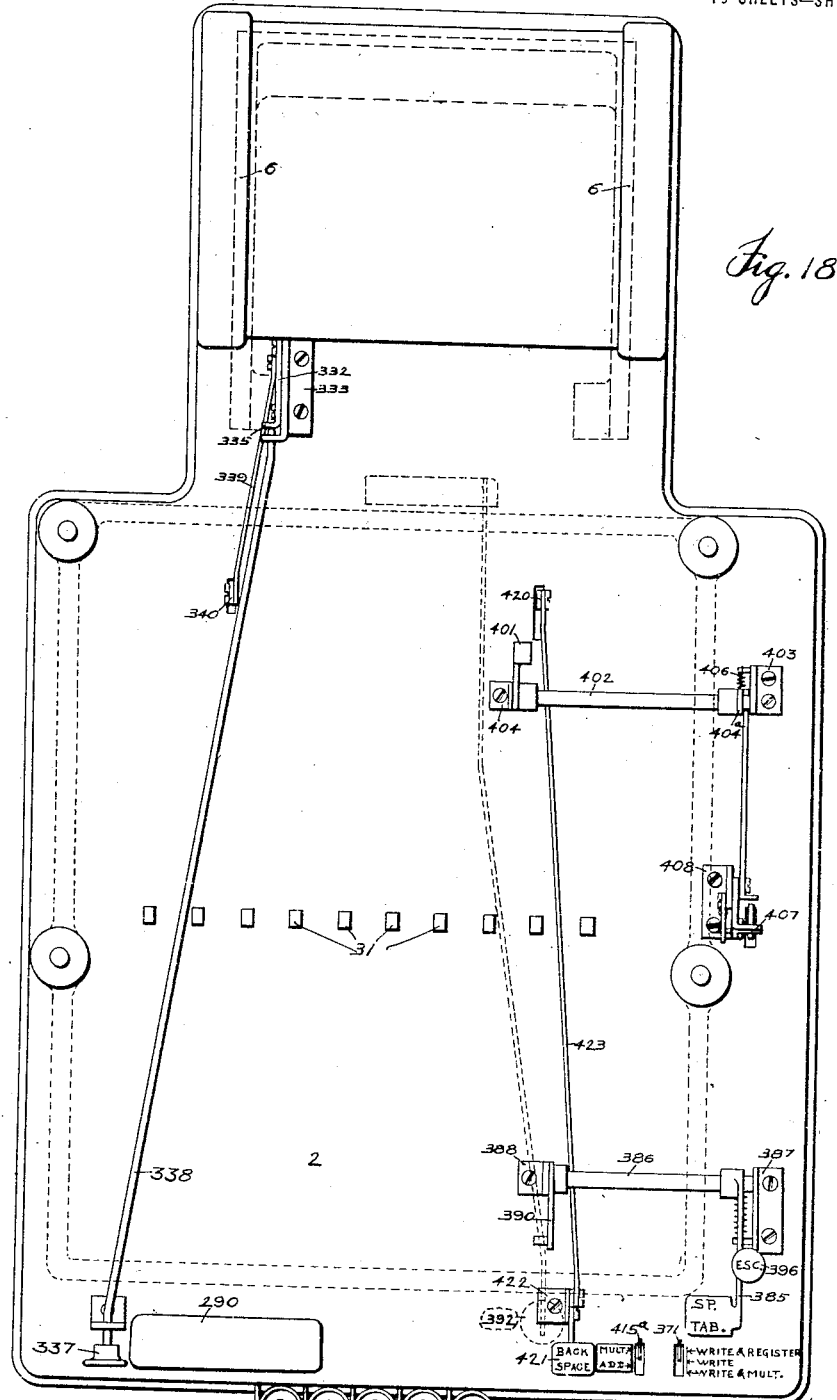

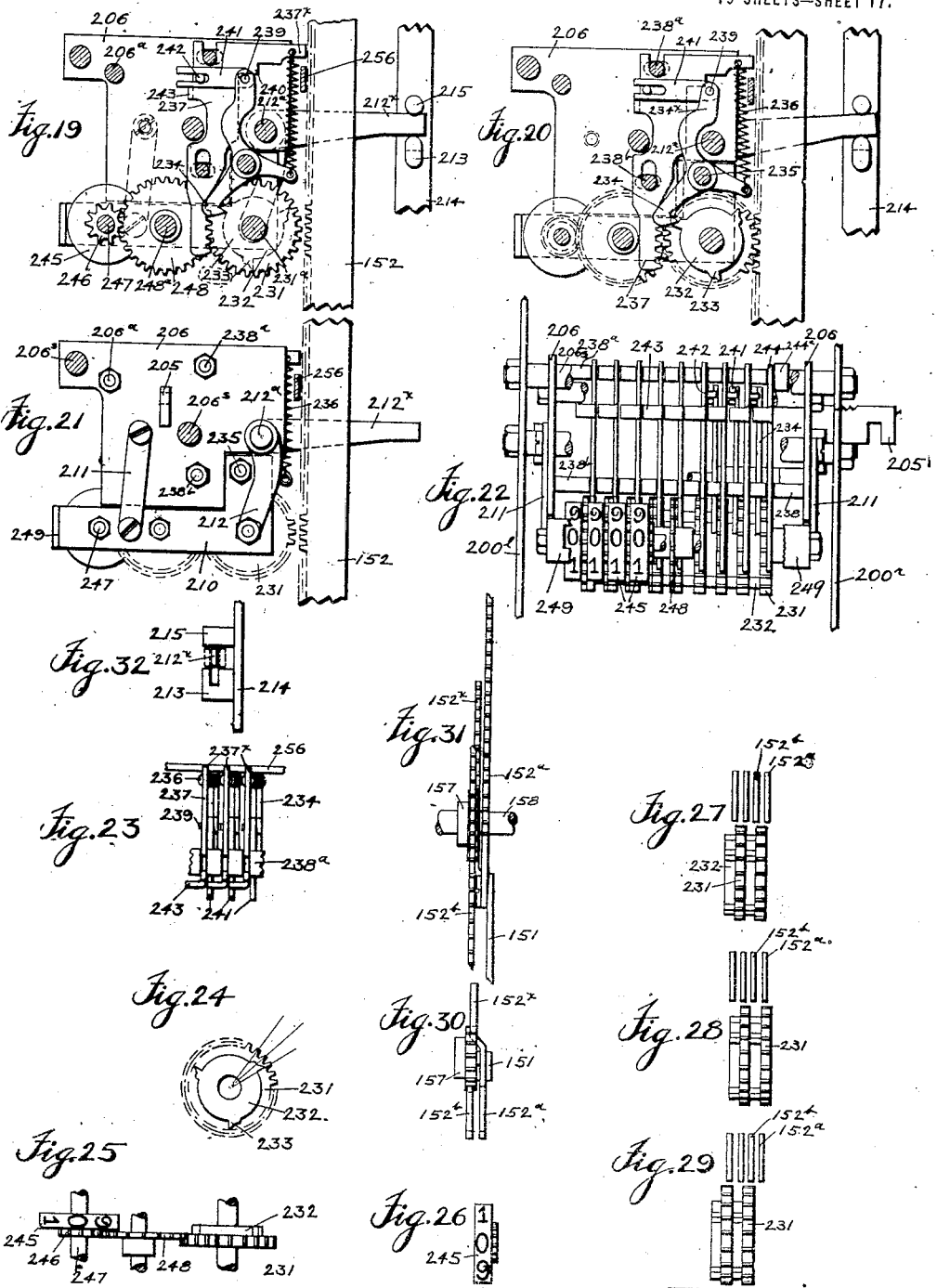

R. VON REPPERT.
CALCULATING MACHINE.
APPLICATION FILED DEC. 18, 1917.

1,302,250.

Patented Apr. 29, 1919
19 SHEETS—SHEET 18.

Inventor:
Richard von Reppert,
by Carr+Carr
his Atty's

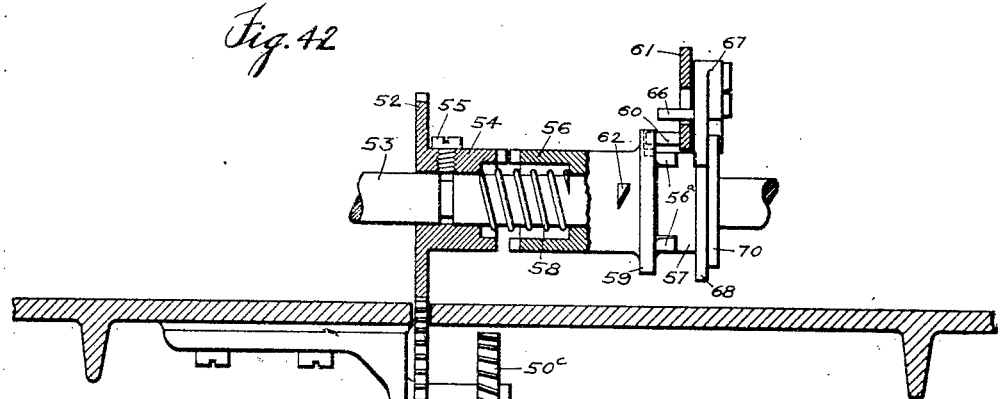
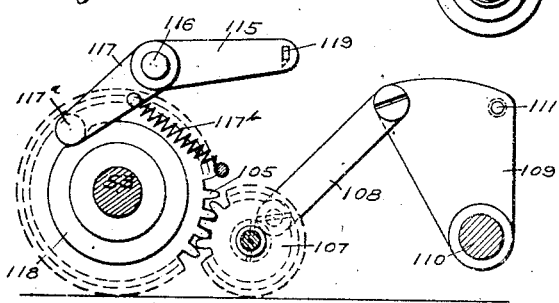
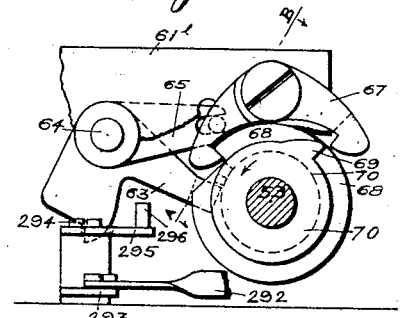
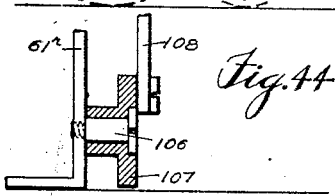
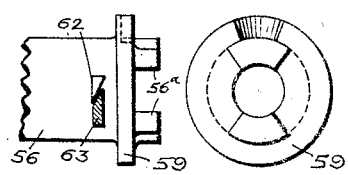
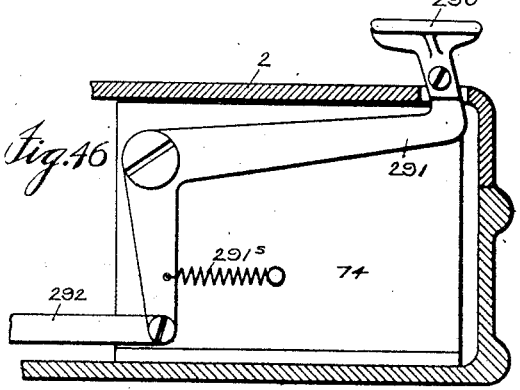

UNITED STATES PATENT OFFICE.

RICHARD VON REPPERT, OF ST. LOUIS, MISSOURI.

CALCULATING-MACHINE.

1,302,250.  Specification of Letters Patent.  Patented Apr. 29, 1919.

Application filed December 18, 1917. Serial No. 207,682.

*To all whom it may concern:*

Be it known that I, RICHARD VON REPPERT, a citizen of the United States, and a resident of the city of St. Louis and State of Missouri, have invented certain new and useful Improvements in Calculating-Machines, of which the following is a specification.

This invention relates to calculating machines, and has for its principal object to provide for the use of an ordinary typewriter in connection with a calculating machine.

The invention consists in a machine having typewriting and calculating devices adapted to be used separately and to be operatively connected to perform commercial work in a simple and practical manner, and in which the typewriter numeral keys can be used to simultaneously print and actuate the calculating devices, as, for instance, to print a multiplicand and then the multiplier, and simultaneously with these operations, actuate the calculating devices to multiply and to show the product on the numeral dials; furthermore, to print this product by the operation of the typewriter numeral keys and simultaneously therewith actuate the calculating devices, so that the operation of clearing this product out of the machine will show whether or not the product has been properly printed, thereby simplifying the operation of the machine and the construction thereof, and eliminating the chance of errors resulting from repeating an item on two key boards, one for printing and the other one for calculating.

The invention further consists in having the typewriter numeral keys adapted to simultaneously write an item and register the written item in an item register having numeral disks to visually display the item, and thereby establish operative connection of the multiplying devices, corresponding to the numerals of the item printed and registered, with the totalizing devices.

The invention further consists in a machine having provision for the mounting of a number of interchangeable totalizers, which may be either adding or subtracting totalizers and which can conveniently be so connected that movement representing an item or part products may be imparted to any one or all of said totalizers simultaneously, whereby addition, subtraction, multiplication or division may be simultaneously effected in any one or more of said totalizers according to their respective adoptions.

The invention further consists in a clearing device for clearing or resetting the totalizers to normal or zero position and for simultaneously clearing all such totalizers as may be set to represent the same total, and furthermore, for clearing any totalizer so as thereby to add or subtract the total so cleared out, to or from any one or more totalizers, as desired.

The invention further consists in a special tabulating key which will simultaneously escape the typewriter platen and the item register a predetermined distance and thereby establish coöperation between the multiplying devices and the total wheels of a certain decimal order for the purpose of properly positioning the product or total with respect to the decimal point.

The invention further consists in a settable connection for the typewriter back-space key so that upon operation of same it will escape the item register a unit movement and thereby establish coöperation between the multiplying devices and the total wheels of certain decimal order for the purpose of properly positioning the product or total with respect to the decimal point.

The invention further consists in an extra set of multiplying keys representing the numerals 0 to 9 adapted to be actuated to multiply an item without printing it.

The invention further consists in a back-space key for the item register to back-space the carriage to thereby establish operative connection of the multiplying devices with the total wheels of a certain decimal order as is necessary in the operation of division by subtraction.

The invention further consists in the arrangements and combinations of parts hereinafter described and claimed.

In the drawings, in which like symbols are used to designate like parts wherever they appear, Figure 1 is a side elevation of the entire machine;

Fig. 2 is a front elevation of the front part of the machine with some parts omitted and a part of the casing broken off to show the controlling devices;

Fig. 3 is a longitudinal section at the line E—F of Figs. 4, 5 and 9, and shows the register connections;

Fig. 4 is a plan view of the front portion of the machine with parts of the cover broken away to show the multiplying key connections;

Fig. 5 is a plan view of the rear part of the machine, being a continuation of Fig. 4, and showing the motor driven main shaft and connections thereto;

Fig. 6 is a longitudinal section of the front part of the machine at the line M—N of Figs. 4 and 5;

Fig. 11 is a side elevation of the upper part of the machine, showing the actuating device for the carrying devices and the setting devices for the totalizers;

Fig. 12 is a front elevation of the upper portion of the machine showing the front plate of the casing and the visible dials of the totalizers and of the item register;

Fig. 13 is a left side elevation of the lower portion of the rear part of the machine, showing more particularly the clearing device;

Fig. 14 is the same as Fig. 13 with some parts removed to show others more clearly;

Fig. 16 is a side elevation inside of the left main side plate; the housing for the product plate is shown in section to show the resetting device for the product plates;

Fig. 17 is a side elevation of the controlling devices;

Fig. 18 is a plan view of the entire machine with the typewriter removed, but the outline of its frame indicated by a dotted line;

Figure 48:
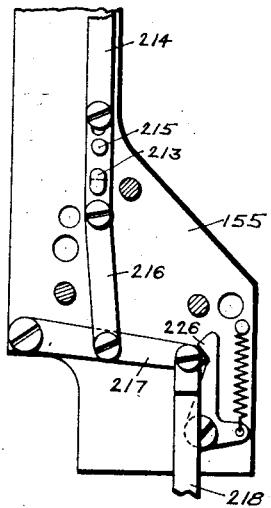
Figure 52:
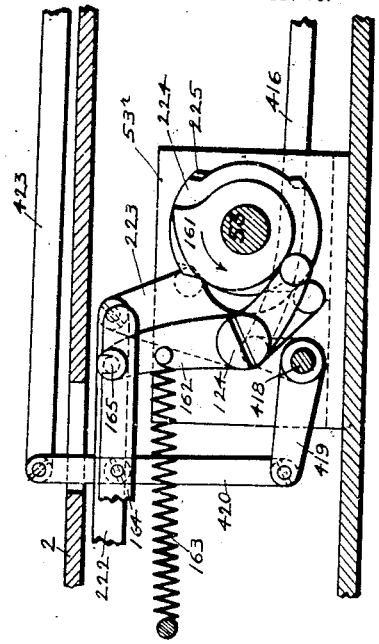
Figure 33:
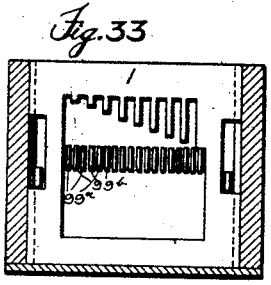
Figure 34:
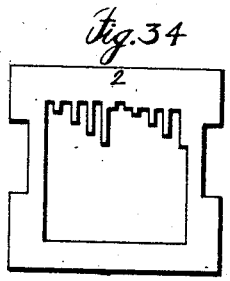
Figure 35:
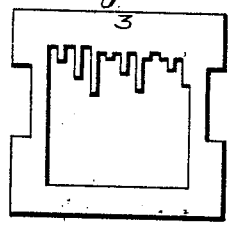
Figure 36:
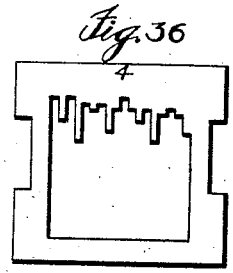
Figure 37:
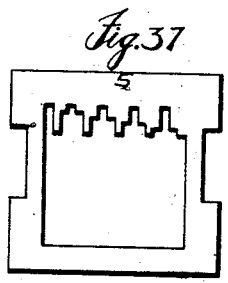
Figure 38:
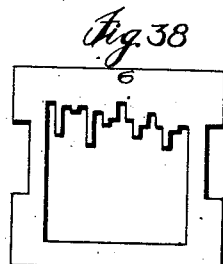
Figure 39:
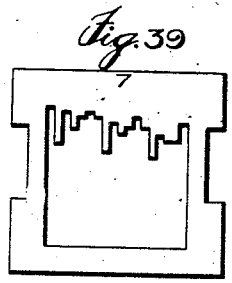
Figure 40:
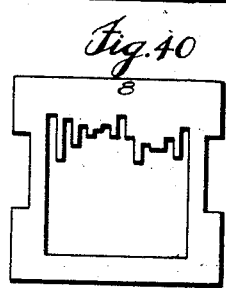
Figure 41:
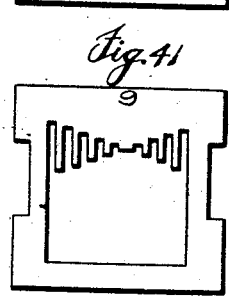
Figure 51:
Figure 53:
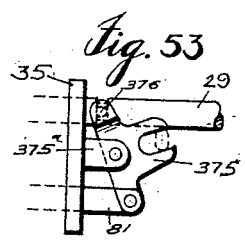
Figure 56:
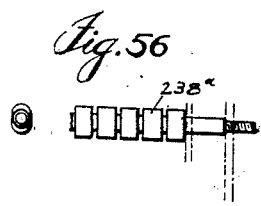

Fig. 19 to an including Fig. 26 are detail views of a totalizer;

Fig. 27 to and including Fig. 31 are details of the actuating rack bars for the total wheels;

Fig. 32 is a detail of the connecting device of a totalizer;

Fig. 33 to and including Fig. 41 are detail views of the product plates;

Fig. 42 is a detail view of the main shaft drive and the clutch;

Fig. 43 is a section on the line C—D of Fig. 5, looking toward the left, and showing the drive mechanism for the universal drive frame;

Fig. 44 is a detail of the gear 107;

Fig. 45 and Fig. 46 are detail views of the operating lever, and the connections from same to the actuating devices for the main shaft clutch;

Fig. 47 is a detail view of the set knob for the totalizer;

Fig. 48 is a detail view of the connecting device for the totalizers;

Fig. 49 is a detail of the lock device for the operating bar;

Fig. 50 is a detail of the cam for the alining device for the rack bars;

Fig. 51 is a detail of the lock-rack 244 for the right-hand total wheel of a totalizer;

Fig. 52 is a detail of the lower end of the link 24;

Fig. 53 is a detail of the lever 375 and the shafts 29 and 81 actuated thereby;

Fig. 54 is a view of the clutch sleeve 56 at the line A—B of Fig. 45;

Fig. 55 is an end view of the clutch sleeve 56;

Fig. 56 is a detail of the shaft 238$^a$.

*General arrangement.*

The general arrangement of the parts of the machine is briefly as follows: An ordinary typewriting machine is mounted on a low flat casing hereinafter termed the "base section" and this "base section" incloses certain elements, which are adapted to constitute an operative connection between the typewriter mechanism and the calculating mechanism. Mounted on the rear end of the base section and back of the typewriter is an upright casing which incloses the calculating mechanism and is hereinafter called the "calculating section."

In this machine, multiplication is accomplished by the direct or short method, involving the use of multiplying and adding devices, in contra-distinction to the indirect or long method, consisting of repeated addition and requiring the use of adding devices only. To briefly indicate the operation of the machine, take the following example: 45 multiplied by 7=315. Multiplying each figure of the multiplicand "45" separately we have: 7×4=28, *i. e.*, 2 tens and 8 units, and 7×5=35, *i. e.*, 3 tens and 5 units.

The multiplying devices are designed to rotate the adding or total wheels in two successive periods, constituting a cycle and in the first period two of the total wheels are rotated, the left-hand or first total wheel being rotated in proportion to the 2 tens of the product "28," and the second total wheel, that is, the next one on the right, is rotated proportionately to the 3 tens of the product "35." Thus, the first or left hand total wheel is rotated 2 angular units and the second, being the next one on the right hand, is rotated 3 angular units. In the second period of the cycle, said second total wheel is further rotated and also a third total wheel, namely, the next total wheel to the right of the two first mentioned. The extent of the second rotary movement of the second total wheel is 8 angular units, i. e., proportionate to the 8 units of the product "28," and the extent of the rotary movement of the third total wheel is 5 angular units, i. e., proportionate to the 5 units of the product "35." In the present machine, the operation of performing this multiplication will be shown on the numeral dials of the total wheels, thus:

```
000000000—Normal or zero position of total wheels.
000000230—Position of total wheels after first period.
000000085—
———————
000000315—Position of total wheels after second period.
```

It is, of course, understood that tens carrying devices are provided between adjacent total wheels to carry over the tens values as, for instance, the tens value produced by the addition of 8 and 3 in the above example. In the machine shown in this application, addition and subtraction are accomplished by actuating a certain key hereinafter designated as the "No. 1 multiplying key." The totalizers, hereinafter designated as "totalizers Nos. 1, 2 and 3," respectively, are adapted for multiplication and addition. They can, however, be actuated in reverse direction for clearing action, and thereby the total contained therein is eliminated, bringing the total wheels to zero. The totalizer hereinafter designated as No. 4 is adapted for subtraction and division. The total wheels thereof are, however, subject to entering movement in positive direction, to thereby position same to represent a minuend or dividend.

*Outline of the machine.*

The typewriter numeral keys are adapted to print an item and simultaneously register the same in an item register for the purpose of further operation such as adding or subtracting the same or for multiplying the item by another figure or figures. Such key operation causes item members, mounted in a movable carriage, to be moved and set in proportion to the figures of the item registered and to be moved laterally in unison, thereby being set into operative relation with the multiplying devices corresponding to the item registered. The typewriter numeral keys are also adapted to be connected to the multiplying devices and to actuate these to simultaneously print the multiplier and to actuate the devices of corresponding number. The multiplying keys proper, located in front of the base casing actuate the multiplying devices but do not print.

The operation of a key for the purpose of multiplying causes a driving shaft to be rotated one revolution and thereby causes two actuations of the multiplying devices connected to the particular key operated and, through them, effects two actuations of the product plates (hereinafter described). The first actuation of the product plates is proportionate to the tens values of the product of the numeral of the key operated, multiplied by the numerals represented by the product plates, and the second actuation of the product plates is proportionate to the units values of the numeral of the key operated, multiplied by the numerals represented by the product plates. The operation of the multiplying key representing the numeral 8, for instance, will not cause the product plate representing the numeral 1 to be moved during the first actuation of the multiplying device, but it will cause said product plate to be moved eight space units during the second operation; as 8×1 produces no tens, but eight units. The product plate representing the numeral 2 will be moved one space unit during the first actuation and six space units during the second operation, as 8×2 gives a product of one tens and six units.

The hereinbefore mentioned individual movement of the item members for the purpose of registering an item is utilized for the selection of such product plates, as correspond to the figures of the item set up in the item register, and the lateral movement of the item members, in unison, is utilized to establish operative connection between the product plates so selected and the actuating means for the totalizers. For instance, the registering of the item "357" will move and set three item members, 3, 5 and 7 space units, respectively, from normal position and, by reason of movable members mounted on the item members, in this instance, lugs 140, direct connection is established between the product plates representing the numerals 3, 5 and 7, and three total wheels. In this instance, such connection is made by means of certain links 145 and racks 152ª, 152ᵇ. In practical operation of the machine, it is found desirable to move the register carriage additional space units to thereby establish coöperation with the total wheels of higher decimal order. A device is provided to back-space the carriage and the item members one space unit after delivery of the tens values of the product, so that the units values are delivered to the total wheels of the next lower decimal order. Knobs are provided to set the totalizers from neutral to operative position, thereby setting the same into cooperative position with the devices that move them in and out of mesh with the actuating devices.

Brief sketch of operation.

Before entering upon the detailed description of the machine, I will briefly describe the operation of making out a simple bill such, for instance, as the following:

"28 bbls. of apples @ $4.75 per bbl.
15 bbls. of potatoes @ 12.65 per bbl.
Less 6%"

Under all conditions of practice, the typewriter is capable of doing all the usual work of the ordinary typewriter, but, by means of a manually operable setting lever, the numeral keys (and certain others hereinafter mentioned) may be brought into such relation to the calculating mechanism as to actuate the register or actuate the multiplying device, or have no effect on either the register or the multiplying device. The setting lever being first set in position to effect the register, that is, in the position marked "Write and register", the item "28 bbls. of apples" is written on the typewriter in the ordinary manner, and thereby the item "28" is simultaneously entered or registered in the item register, and thus becomes subject to multiplication. Before multiplying by 4.75, however, a special tabulating key is operated to bring the typewriter platen to a predetermined position corresponding to the decimal point of the multiplier "4.75", and the platen is then backspaced once by the operation of the typewriter back-space key to bring the 4 into the proper position to the left of the decimal point. The operation of the special tabulating key is arranged to effect the register to thereby bring the decimal point of the product, shown on the dials of a totalizer, into proper position. The setting lever of the machine is now shifted from the position marked "Write and enter" to the position marked "Write and multiply", and the No. 4 typewriter numeral key is operated to write the 4, then the decimal point key is operated, then the 7 key, and lastly the 5 key. A little time is permitted to lapse between the operation of these keys to give the motor driven devices time to operate. The totalizers No. 1 and No. 2, which we assume to have been set to receiving or multiplying position, will now show on their visible dials the product of the multiplication of 28×4.75=133.00. The typewriter tabulating key is next operated to space the typewriter platen to the total printing column, and the operating bar of the calculating device is operated to clear or re-set the item register which contains the item "28"; the setting lever is set to "Write and register", and the total "133.00" is next written and registered. The totalizer No. 1 is next set to clearing position, the multiplying key representing the numeral 1 is operated and thereby the total "133.00" is subtracted or cleared out of No. 1 totalizer and then the operating bar is operated to clear the item register.

The next item "15 bbls. of potatoes @ $12.65" is next written and entered in the same manner as the first, causing the No. 2 totalizer to show the grand total of the two products, "322.75". No. 1 totalizer is now cleared as before, then the grand total is written and simultaneously registered in the item register, to be used for clearing No. 2 totalizer and for deducting the "6%" the example calls for. To obtain "322.75" less "6%", this item "322.75" now contained in the item register as described, is multiplied by .94 by the operation of the multiplying keys located in front of the typewriter key board. This multiplication can be entered into any one of the totalizers by setting the selected one to multiplying position prior to multiplying. The total, less discount, equaling "297.32" is then printed, and the totalizers are cleared, as described.

Frame.

Figure 7:
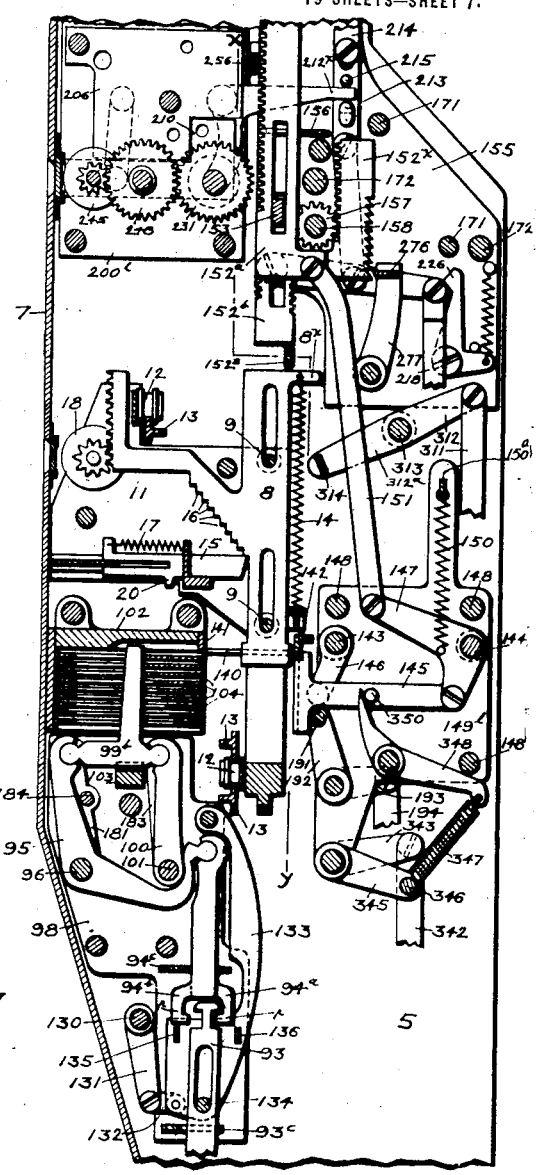
Fig. 7 is a longitudinal section through the rear part of the machine, showing the multiplying devices, the item register and the connections to the totalizers.

The base casing 1 has a cover 2 on which is mounted a typewriter 3 of ordinary construction (see Figs. 1, 3 and 7). In the rear portion of this casing are mounted frame side plates 4 and 5, and an outside casing 6 incloses the frame plates and has on its front plate 7 openings to give free view of the dials 245 of the totalizers and of the dials 18 of the item register.

Item register.

Figure 9:
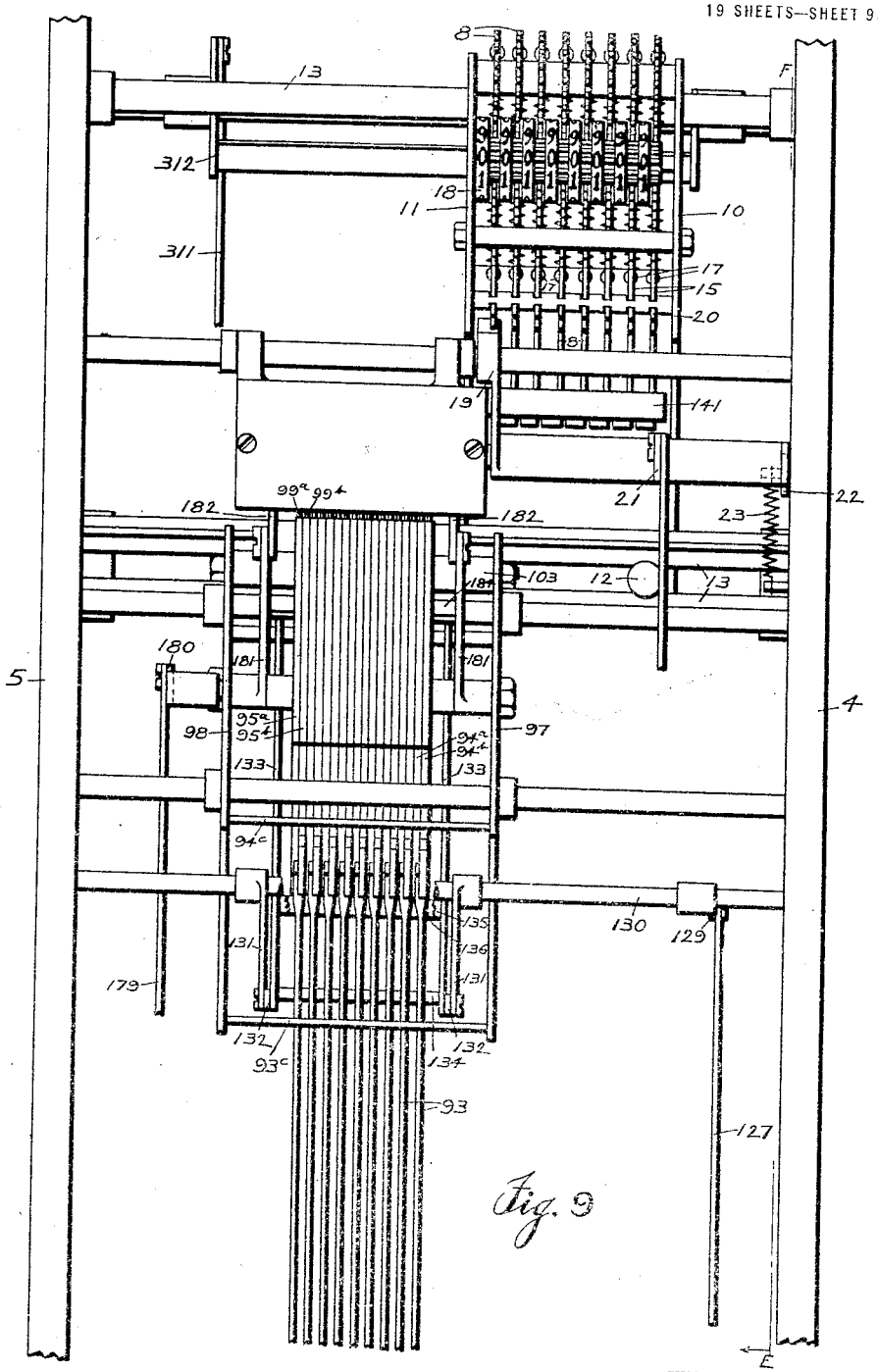
Fig. 9 is a front elevation of the lower portion of the rear part of the machine, showing the connections to the multiplying devices and the register, the parts to the rear of those shown being omitted for the sake of clearness.

The item register is mounted in the frame plates 4 and 5, and this item register comprises a movable carriage and is subject to actuation by the typewriter numeral keys 3ª. A series of item members 8 (see Figs. 7 and 9) are slidingly mounted on grooved rods 9 which rods also serve to space apart the carriage side plates 10 and 11. The carriage is provided with rollers 12 which run on rails 13 mounted in the side plates 4 and 5, thus enabling the carriage to have lateral movement. Springs 14 tend to move the item members from normal position, but said item members are normally held against such movement by movable stops 15 engaging the lowest of a series of steps 16 cut in said item members. Springs 17 tend to retain said stops in normal position. Dials 18 carrying the visible numerals 0 to 9 are in mesh with the item members and indicate the position assumed by the item members (see Figs. 3 and 7). A set lever 19 is mounted on a sleeve 19ª on a shaft 19ᵇ mounted in the side plate 4 and is adapted to engage a tooth 20 provided on the lower edge of each of said movable stops 15. On the same sleeve with the lever 19 are a lever 21 and a lever 22. A retaining spring 23 is connected to the lever 22 and tends to hold the parts in normal position. A link 24 connected to the lever 21 extends down to and connects with a lever 25 mounted in a bracket 26 which in turn is mounted in the rear of the base casing (see Figs. 3 and 15). A link 27 connects this lever to a lever 28 on a cam shaft 29 mounted in the uprights 35 and 36 (see Figs. 3, 4 and 6). A series of cam levers 30 are mounted on this shaft and are adapted to be actuated by vertical key stems 31, and that through anti-friction rollers 32 thereon. The key stems 31 are slidingly mounted in horizontal plates 33 and 34 mounted on the uprights 35 and 36, and are held in upper or normal position by springs 37. The upper ends of the respective key stems are bent over to offer a wider surface to the bottom edge of the typewriter numeral keys under which the key stems are positioned. Said cam shaft 29 is arranged to have a short lateral sliding movement so as to move the cam levers 30 out of operative relation with the rollers 32 and thereby enable the key stems 31 to be ineffectively actuated so far as these cam levers are concerned. The range of the angular movement of the cam shaft is divided into ten space units, and the zero key actuates the shaft one space unit, and the No. 1 key actuates the shaft two space units, etc. The link 24 has a short slot in which slidably engages the pin which pivotally connects said link with the lever 25 (see Fig. 52). The lost motion thus permitted is sufficient to make the first unit of movement of the lever 25 idle and ineffective to move the link 24. The parts so arranged that each of the typewriter numeral keys, except the zero key, is adapted to move that one of the stops 15 which happens to be in operative relation thereto, a distance proportionate to the numeral of the key operated and thereby release the corresponding item member and again stop it after it has moved as many space units as the numeral of the numeral key operated denotes. The visible dial in mesh with said item member will then exhibit the same numeral as the key that has been operated and therefore affords a checking means for the operation of the numeral keys.

Step by step lateral movement of the item register is provided to bring the item members successively into operative relation with said setting means, and also for other purposes hereinafter appearing. For this purpose a spring 38 (see Fig. 8) is connected to a lever 39 pivoted on a cross plate 39ª and has its upper end bifurcated to engage the roller 40 on the item carriage, whereby said spring tends to move the carriage from normal position. A toothed bar 41 on the carriage is engaged by one end of a double-ended escapement pawl 42 pivoted on the cross plate 43, and together they normally hold the carriage against movement. A link 44 is adapted to engage a pin 44ª on the normally free end of the pawl 42. Near its upper end the link 44 has a short slot and a screw 44ᵇ enters through this slot into the cross-plate 43. The lower end of the link 44 is connected to a lever 46 on the shaft 47 mounted in brackets 26 and 48 located in the rear of the base casing (see Figs. 3, 5 and 13). A cam lever 49 on said shaft 47 is arranged to be actuated by the cam 25ª formed on the edge of the lever 25. This lever 25 has been previously mentioned as an element in the item member setting device. The parts are arranged so that the operation of a typewriter numeral key will immediately move the link 44 and that end of the pawl 42 connected thereto, and thereby release the carriage and again stop it after it has traveled a one-half unit movement, then set that item member which happens to be in coöperative position with the setting device, and lastly cause the other one-half unit movement of the carriage at the end of the return stroke of the typewriter key and when the set lever 19 has re-assumed normal position.

THE MULTIPLYING DEVICES.

*The main drive shaft.*

The multiplying devices are not limited to multiplying operation but are also used for the other calculations, division, addition and subtraction. To facilitate the operation of the machine, power driven multiplying and clearing devices are provided. A motor 50 is mounted on the bottom side of the base casing 1 and a worm 50ª on the motor shaft 50ᵇ drives the worm gear 50ᶜ and the gear wheel 51 mounted on the same sleeve with the gear 50ᶜ. The gear wheel 51 engages a gear wheel 52 mounted on a sleeve 54 which is loosely mounted on the main drive shaft 53. The main shaft has its bearings in the brackets 53ʳ and 53¹ mounted in the base casing (see Figs. 1, 5 and 42). The sleeve 54 is also serving as one of two members forming a clutch, and is held in normal lateral position by a screw 55 in the sleeve engaging a groove in the main shaft 53. The gear wheel 52 has continued rotation whenever the motor is running and the aforesaid clutch is provided to cause a single rotation of the main shaft for every actuation of the clutch. The second member of the clutch is a sleeve 56 loosely mounted on the main shaft and on one end of the sleeve are a number of teeth arranged to engage the driving tooth on the above mentioned clutch member 54. The other end of the sleeve 56 has projections 56ª to engage, and have sliding connection with a slotted sleeve 57 tight on the main shaft. A helical spring 58 encircling the main shaft tends to hold the sleeve 56 in normal or disengaged position. The flange 59 on the clutch sleeve 56 has a broad V-groove on the side and this groove normally is engaged by the pin 60 on the bracket 61¹. The purpose of the pin is to hold the sleeve in engaged position during the rotation of the main shaft. On the clutch sleeve 56 is a wedge-shaped pin 62 adapted to be actuated by the wedge-shaped end of the lever 63 on the shaft 64 mounted in brackets 61¹ and 61ʳ, for the purpose of moving the sleeve into engagement with the driving member 54 (see Figs. 45, 54 and 55). A lever 65 on the aforesaid shaft 64 engages with its slotted end a pin 66 on a stop pawl 67 oscillatingly mounted on the bracket 61¹. The rear end of this pawl 67 normally engages a lock notch in the disk 68 tight on the main shaft (see Fig. 45) and the fore end of the pawl is adapted to be moved into the path of a projection 69 on the disk 70 adjacent to disk 68 and also tight on the main shaft. The parts are so arranged that an oscillation of the shaft 64 raises the rear end of the pawl 67, and thereby releases the main shaft for rotation and simultaneously therewith shifts the clutch sleeve 56 into engagement with the constantly rotating member 54. When nearing the completion of one revolution, the projection on the disk 70 will engage the front end of the pawl 67 and force the rear end of the pawl down into the above-mentioned lock-notch and thereby positively stop the main shaft.

The shaft 64 is oscillated by the multiplying keys, the operating lever and also by the typewriter numeral keys when these are connected to the calculating devices.

The multiplying keys 71 are loosely mounted on a shaft 72 in brackets 73 and 74 mounted in the front end of the base casing (see Figs. 4 and 6), and are held in normal position by springs 71ˢ connected thereto and to the spring plate 71ᵃ. Cam levers 75 loosely mounted on a shaft 76 in aforesaid brackets 73 and 74 carry pins 77 which are engaged by cam surfaces on the multiplying keys, for the purpose of being moved by the depressing movement or operation of the keys. The cam levers are held in normal position by springs 78 connected thereto and to the spring plate 71ᵃ. Links 79 are connected to the upper ends of the cam levers 75 by screws 79ᵃ entering through slots in the front ends of the links. The rear ends of the links connect with a series of cam levers 80 loose on a shaft 81 mounted in the above mentioned uprights 35 and 36. The aforesaid stems 31, which are subject to operation by the typewriter numeral keys, are arranged to move the cam levers 80 by means of anti-friction rollers 82 mounted on the stems. The parts are so arranged that the cam levers 80 can be actuated either by the multiplying keys, and in that instance the screws 79ᵃ engaging the slots in the links 79 move idle, or by the typewriter numeral keys, through the connections described. In the latter instance, the chance of an error resulting from the operation of two separate sets of keys, one to write and one to multiply, is avoided, and of course, it likewise facilitates the operation of the machine.

Links 83 connect to the lower ends of the cam levers 75 and to the lower ends of levers 84 loosely mounted on the above mentioned shaft 64 in the brackets 61¹ and 61ʳ, which is actuated to operate the clutch for the main shaft.

The rear extensions 84ᵃ of these levers 84 are slotted and pins 86 on links 87 rest in those slots. The front ends of links 87 are spaced apart and guided by the comb plate 88 mounted on the brackets 61¹ and 61ʳ, and the links are locked against movement by the lock shaft 89 mounted in the brackets 61¹ and 61ʳ (see Figs. 5 and 7). The rear ends of the links are connected to bell cranks 90 loosely mounted on a shaft 91 in uprights 48 and 92 mounted in the rear part of the base casing. Links 93 connect to the other arms of the bell cranks 90 and the upper ends of these links are thickened to about double thickness and have notches adapted to engage projections 94ʳ on the lower ends of drop links numbered 94ᵃ and 94ᵇ (see Figs. 7, 8 and 9). The upper ends of the links 93 are spaced and guided by a comb plate 93ᶜ mounted in the frame plates 97 and 98. One drop link 94ᵃ, and one drop link 94ᵇ, coöperate with each link 93 and as there are nine links 93 there will be eighteen drop links in all. The upper ends of these links are connected to a like number of bell cranks 95ᵃ and 95ᵇ loosely mounted on a shaft 96 in the frame plates 97 and 98, and a plate 94ᶜ mounted in these frame plates holds the lower ends of the links in position. To the other arms of these bell cranks 95, links 99ᵃ and 99ᵇ are connected and levers 100ᵃ and 100ᵇ, loosely mounted on a shaft 101 in the frame plates 97 and 98, connect to the other ends of said links. The vertical extensions 99ˣ of the links 99ᵃ and 99ᵇ are spaced and guided by slots in the housing 102 and a comb plate 103 spaces and guides the lower edges of the links. The links 99ᵃ and 99ᵇ, and more particularly the vertical extensions 99ˣ thereof, are the driving means for the product plates 104 slidingly mounted in the housing 102.

*Power drive mechanism for product plates.*

Before proceeding with the description of the product plates, I will describe how movement is imparted to the above mentioned links 87 by the motor driven main shaft (see Figs. 5, 6, 43 and 44). Tight on the main shaft is the gear wheel 105 and in mesh therewith is a small gear 107 mounted on a stud in the bracket 86. The gear ratio of these two gears is two to one so that a single revolution of the main shaft imparts two revolutions to the small gear 107. A link 108 is eccentrically mounted on the small gear 107 and connects to the side plate of a rocking frame 109 whose shaft 110 is fulcrumed in the brackets 61$^r$ and 61$^l$. The rocking frame 109 constitutes the driving means universal to all the multiplying devices and is therefore hereinafter referred to as the "universal drive frame." A cross rod 111 in this rocking frame underlies the links 87 and normally is in position to be engaged by the notches in the lower edges of said links. The lever 63 on the afore-mentioned shaft 64, whose oscillation controls the clutch for the main shaft, has a downward extension 63$^a$, and a cross rod 112 mounted in this extension, extends to the lever 113 mounted on the right end of the shaft 64. This rod is in position to be engaged and moved by the extensions 84$^b$ of the levers 84 (see Figs. 5 and 6). The parts are so arranged that the actuation of an operating key moves the corresponding lever 84 to depress the link 87 connected thereto, which thereby engages the rocking frame rod 111 and simultaneously therewith actuates the main shaft clutch 56, so that the resulting revolution of the main shaft causes two reciprocating movements of that link 87 connected to the rocking frame, and by reason of the connections described causes two reciprocating movements of such drive link or links 99 as are, or become, operatively connected to said link 87 in the course of a cycle. A lock is provided to lock that lever 84 which has been operated, in operative position during the course of a cycle, and to lock all other levers 84 against operation during this cycle. The shaft 116 of the lock frame is fulcrumed in the brackets 61$^r$ and 61$^l$, and a lever 117 mounted thereon engages, by means of an antifriction roller 117$^a$, the lock disk 118 tight on the main shaft (see Figs. 5 and 43). This disk has a recess in which the roller 117$^a$ normally rests, and a cross plate 119 is mounted in two rearwardly extending levers 115 mounted on the shaft 116. The levers 84 have lock projections 84$^c$ and upon rotation of the main shaft the plate 119 will be moved down in back of the lock projections of the levers which are in normal position and locks them against operation and in front of the lock projection of the lever that has been operated and locks it in operated position during one revolution of the main shaft. A spring 117$^b$ is connected to the lever 117 to re-set it to and hold it in normal position.

*To shift the drive mechanism from tens to units position and back.*

In the preceding paragraphs it has been described that the drive links 99$^a$ and 99$^b$ for the product plates 104 are arranged in nine sets of two links per set and connected to operating keys having the numerals 1 to 9; furthermore, that the operation of said keys causes the corresponding drive links to have reciprocating movement.

For purposes hereinafter appearing, it is necessary that upon the operation of a multiplying key, the drive link 99$^a$ of a set is first actuated and then drive link 99$^b$ of this set. On the right end of the main shaft are the cam disks 121 and 122 (see Figs. 3 and 5), and a lever 123 pivoted on a stud 124 in the bracket 53$^r$ has two anti-friction rollers engaging the two cam disks, respectively. A link 125 connects to the upper arm of the cam lever and to a lever 126 pivoted on a stud 117 in the bracket 26. A link 127 is connected to a lever 128 which is mounted on the same sleeve with the lever 126, and this link extends upward and connects to a lever 129 on a shaft 130 mounted in the side plates 4 and 5. From this shaft two levers 131 extend downward (see Figs. 7 and 9) and short links 132 are connected to the lower extremities thereof and to an oscillatable frame 133, which, on its upper end, is mounted in the frame plates 97 and 98. A cross rod 134 mounted in this oscillatable frame extends through the slots in the links 93 and thereby is adapted to move said links forward and backward in unison. Normally, the links engage the drop links 94$^b$ and upon rotation of the main shaft are immediately moved rearward to engage the drop links 94$^a$, as shown in Fig. 7, and remain in engagement therewith during one-half revolution of the main shaft, and will then be moved back into coöperative position with the drop links 94$^b$ and remain in this position during the second half of the main shaft revolution. The parts are so arranged that, upon operation of a key for multiplication, etc., the drop link 94$^a$ connected thereto is actuated, i. e., receives reciprocating movement during the first one-half revolution of the main shaft, and the drop links 94$^b$ of this set are actuated during the second half revolution of the main shaft. To hold links 94$^b$ in normal or upper position during the operation of a drop link 94ª, a lock plate 135 is mounted in the frame 133 and will, by the oscillation of said frame, be moved under the projections in said links. A lock plate 136 in said frame coöperates in like manner with the drop links 94ª during the actuation of a link 94ᵇ.

The product plates.

The function of the product plates is to transmit movement proportionate in extent to the tens and units part products of a multiplication to the totalizing mechanism.

As stated before, the product plates 104 are slidingly mounted in bodily alinement flatwise in the housing 102 (see Fig. 7). The extensions 99ˣ of the drive links 99 extend through the openings in the product plates and each drive link is, therefore, in position to engage and actuate all of the product plates. The nine product plates correspond to the numerals 1 to 9, and are arranged in numerical order, commencing with the uppermost one. The figures 33 to 41 are views of the nine product plates, and the upper side of each plate carries a number to denote the plate number. The relative position of the product plates and the drive links 99 can be well understood from Fig. 33, which shows No. 1, the uppermost of the product plates. The drive links 99 are arranged in nine groups of two links, and commencing at the left, are connected to the multiplying keys 1 to 9, respectively. The left link, or link 99ª, of a group is first actuated to produce movement proportionate in extent to the tens part product of the plate number multiplied by the key number, and then the right link, or link 99ᵇ, of a group is actuated to produce movement proportionate in extent to the units part product of the plate number multiplied by the key number. The total movement of the links 99 is divided into nine space units and on product plate No. 1 shown in Fig. 33 is the distance from the rear edge of the links 99, to the bottom of the slots in the product plate. The edge of the plates opposite the links is divided into 18 spaces, a space being allotted to each drive link 99 and commencing from the left, the first space is opposite the tens drive link of No. 1 multiplying key, the second space is opposite the units drive link of No. 1 multiplying key, the third space is opposite the tens link of No. 2 multiplying key, etc. The edge of each plate is cut back in these spaces, so that a link will have idle travel and move the plates only so many space units as are proportionate to the part product of the plate number multiplied by the numeral of the multiplying key connected to the link actuated. Referring to Fig. 33, it will be seen that the actuation of the tens links, *i. e.*, links 99ª will not cause movement of the plate, as no tens are contained in the products of 1, which is the number of the plate, multiplied by the numerals 1 to 9; but it will be seen that the actuation of the units links, *i. e.*, links 99ᵇ will cause movement of the plate corresponding in space units to the products of 1 multiplied by the numerals of the multiplying keys connected to the links. From the foregoing, it will be understood that, when a multiplying key is operated, all the product plates will be subject to two actuations, first proportionate to the tens value, and then proportionate to the units value. For instance, assuming the seventh key to be operated: The No. 1 plate will have no tens value movement and 7 units value movements. No. 2 plate will have 1 tens and 4 units value movements. The No. 3 plate will have 2 tens and 1 units value movement, and so forth. Assuming now means to transmit the movement of Nos. 1, 2 and 3 product plates to a series of total wheels with adding devices, and that the units values are delivered to the total wheels of one lower decimal order, the operation will take place in the machine as follows:

Normal position of total wheels__ 000000000
Delivering the tens values_____    012
Delivering the unit values to the
  total wheels of next lower order _____    741
                                   ─────────
                                        861

The connections to the totalizers.

The item members 8 of the item register have lugs 140 slidingly mounted on their lower ends, and when the item members are in upper or normal position, (Figs. 7, 8 and 10,) these lugs are confined between the lock plate 141 mounted on the housing 102 of the product plates, and the lock plate 142 mounted in the side plates 4 and 5. The operation of registering a single figure will cause movement of an item member in proportion to this figure, and thereby bring the lug 140 mounted on this item member in operative relation to the product plate corresponding in number to this figure. In like manner the lugs on a number of item members are set in operative relation to the product plates corresponding in numbers to the numbers or figures of the item registered by these item members. To the rear of the item members a frame is mounted on shafts 148 which are mounted in the main side plates 4 and 5. This frame is formed by the side plates 149ʳ and 149ˡ, spaced apart by the shafts 143, 144 and 159. A series of levers 146 is loosely mounted on the shaft 143 and a like number of bell cranks 147 are loosely mounted on the shaft 144. Links 145 are connected to the levers 146 and bell cranks 147, and the front ends of these links are considerably widened and a part of this widened portion is bent over and thereby forms a surface at right angles to the body of the link. The operation of registering an item will bring the lugs 140 on the item members in operative relation to the product plates, as stated above, and also in operative relation to the bent over portion of as many links 145 as are figures in the item registered. The links 145 are directly connected to the actuating means of the total wheels and the operation of registering an item will therefore establish operative connection from the product plates to the actuating devices for the total wheels.

Figure 10:
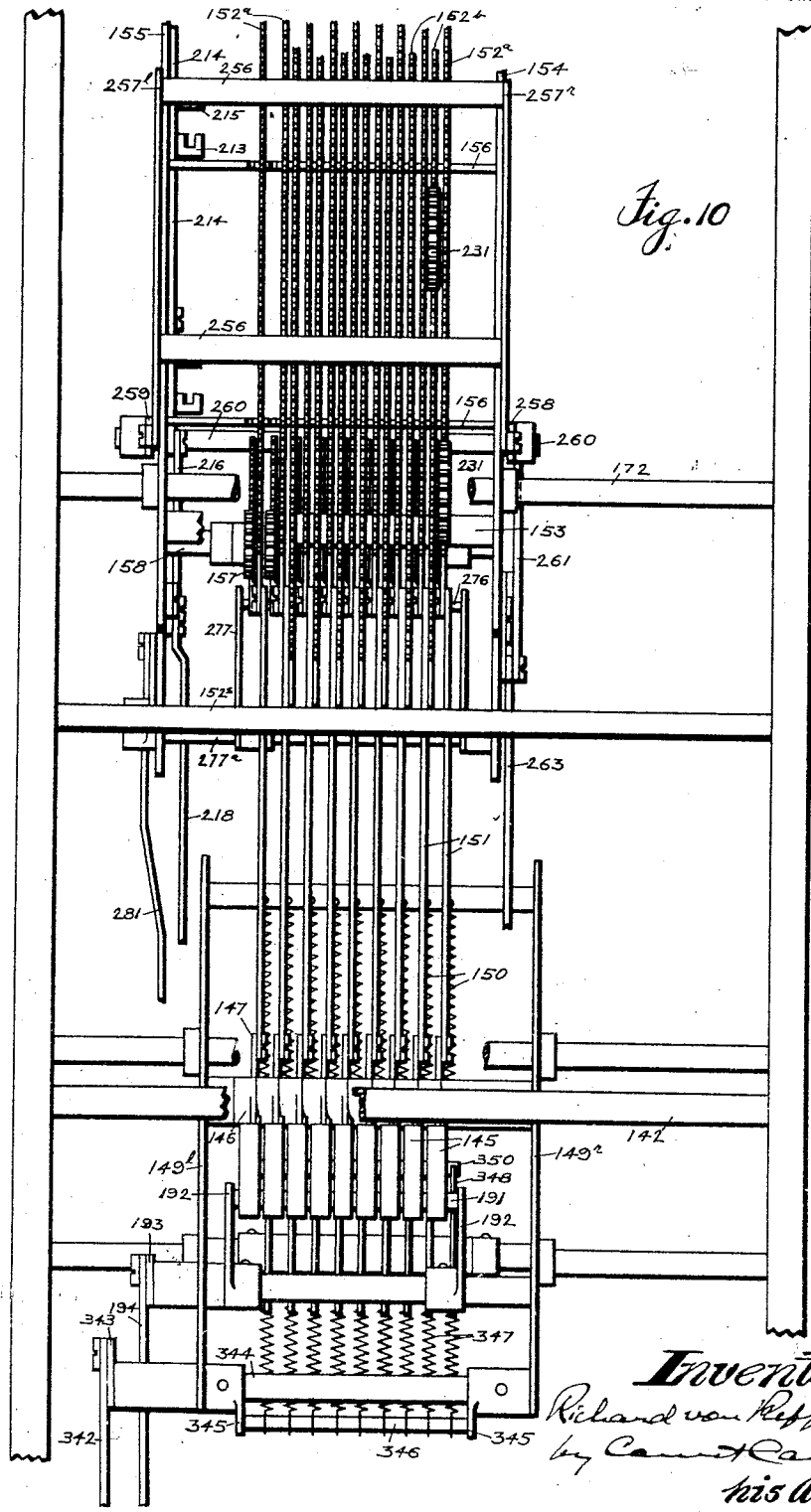
Fig. 10 is a transverse section on the line X—Y of Fig. 7, showing the connections to the totalizers.

A shoulder 160 on the widened portion of the links 145 abuts the lock plate 142, and springs 150 are connected to the bell cranks 147 and to the spring plate 150ª mounted in the frame plates 149 and tends to hold the links in this their normal position. Links 151 are connected to the other arms of the bell cranks 147 and to vertically movable rack bars 152ª. These rack bars are mounted in a frame formed by the side plates 154 and 155, spaced apart by rods 171 and this frame is mounted on the shafts 172 which in turn are mounted in the main side plates 4 and 5. (See Figs. 7, 10 and 11). Each rack bar 152ª has a companion rack bar 152ᵇ and all the rack bars are, by means of slots therein, slidingly mounted on plates 153 mounted in the frame side plates 154 and 155, and are spaced apart and guided by the comb-plates 156 mounted in the frame side plates 154 and 155. Each rack bar 152ª has an offset extension 152ˣ, which has gear teeth to engage a pinion 157 loose on a shaft 158, and this pinion engages the gear teeth on the rear edge of the companion rack bar 152ᵇ to the left of the rack bar 152ª (see Figs. 7, 10, 29 and 30). In Fig. 10, the two left hand rack bars 152ᵇ have been omitted to give a better view of the pinions 157 and the extensions 152ˣ of the rack bars 152ª. By this arrangement, movement imparted to a rack bar 152ª is transmitted to its companion rack bar 152ᵇ, but in reverse direction. The rack bars 152ª serve the purpose of imparting positive or adding movement to the total wheels of the multiplying totalizers and subtracting movement to the total wheels of the dividing totalizer. The rack bars 152ᵇ serve the purpose of imparting negative or clearing movement to the total wheels of the multiplying totalizers, and positive or setting movement to the total wheels of the dividing totalizer. A stop bar 152ˢ is mounted in the main side plates 4 and 5, and the rack bars 152ᵇ normally rest against this plate and are alined thereby.

*The carriage back-space device.*

As hereinbefore stated, the item register carriage is back-spaced one unit movement after the tens values of a product have been delivered to certain of the total wheels, to thereby position the carriage so that operative relation of the product plates and the total wheels of the next lower decimal order than those previously in operative relation is established for the purpose of delivering the unit values of the product to these total wheels. Tight on the main shaft is the cam disk 161, and a lever 162 mounted on the stud 124 engages the cam disk by means of an anti-friction roller thereon (see Figs. 5, 8 and 15). A spring 163 is connected to said lever and to a pin 163ª mounted in the bracket 61ʳ and holds the roller in contact with the disk and actuates the lever for return movement. A link 164 is normally connected to the screw 165 in the upward extending arm of said lever 162, and is adapted to be disconnected therefrom by means described hereinafter. The rear end of said link 164 connects to a bell crank 166 mounted on a stud 166ª in the bracket 26, and a link 167 connects to the other arm of said bell crank and to a bell crank 168 fulcrumed on the cross rail 43. A pawl 169 pivoted on said bell crank normally abuts the extension 43ˣ of said cross rail and is thereby held out of engagement with the toothed bar 41 on the register carriage and that against the tension of a spring 170 connected to the pawl. The cam on the aforesaid cam disk 161 is so positioned relative to the roller on the lever 162 that upon rotation of the main shaft the lever is actuated and the pawl 169 is moved to engage the next left hand tooth of the toothed bar on the carriage. The cam will then release the lever and the pawl will retract the carriage one unit movement and again become disengaged. This retracting movement is timed to take place at one-half revolution of the main shaft, as at this phase the multiplying devices are practically at rest by reason of the drive link 108 of the rocking frame 109 being at dead center.

*The re-setting devices for the product plates and the rack bars.*

On the left end of the shaft 110 of the universal drive frame 109 (see Figs. 5, 13 and 14), a lever 176 is mounted and a link 177 connects thereto and has a disconnectible connection with a bell crank 178 mounted on a stud 176ª in the bracket 92. A link 179 connected to the other arm of this bell crank extends upward and connects to a lever 180 on the shaft 96 on which the bell cranks 95 are loosely mounted, as hereinbefore mentioned (see Figs. 9 and 16). Levers 181 mounted on this shaft extend upward and links 182 connect these levers to levers 183 mounted on the shaft 101 on which the hereinbefore mentioned levers 100 are mounted. These connections provide a parallel motion for the links 182, the same as is provided for drive links 99. The links 182 have extensions 182ˣ which are guided on their upper ends by slots in the housing 102 and the lower edges of the links are guided by the comb plate 103. The upper extensions 182ˣ extend through the broad slots cut in the sides of the product plates, as is best shown in Fig. 33. Normally, they engage the front edge of this cut-out portion and upon actuation of the main shaft and the resulting oscillation of the universal drive frame 109 will move back to release the product plates for movement by the drive links 99, and upon return oscillation of the frame, will re-set the product plates. A cross-rod 184 is mounted in the levers 181 and normally engages the rear edges of the bell cranks 95 to lock them and the parts connected thereto in normal position. To positively re-set the rack bars 152ª and 152ᵇ, a re-setting device is provided which coöperates with the links 145 which are actuated by the register. A rod 191 is mounted in the frame 192 (Figs. 7, 14 and 16), and engages the links 145 actuated by the lugs 140, as described. On the left end of the frame shaft is a lever 193, which is connected by a link 194 to the bell crank 178 actuated by the universal drive frame 109, as hereinbefore described.

The Totalizers.

The setting devices for the totalizers.

In the present machine, four totalizers, numbered 1, 2, 3 and 4, are provided and are mounted in a frame formed by the side plates 200ʳ and 200ˡ spaced apart by the shafts 206ˢ. This frame is mounted on shafts 201 extending across the machine and mounted in the main side plates 4 and 5. The three totalizers numbered 1, 2 and 3 are arranged to perform addition, and the totalizer numbered 4 is arranged to perform subtraction. The totalizers are interchangeable in respect to their mounting within the frame and irrespective of their type, adding or subtracting; and any combination of four totalizers can be mounted. The dividing totalizer should preferably be mounted in the lowest position, as shown in the present machine. This position is nearest to the item register, carrying the divisor, and this arrangement is desirable when performing division, which necessitates inspection of the dividend for the purpose of either estimating the figures of the result or determining the movement to the right of the divisor. To assist the eye in determining the decimal order in which the figures in the item register are, order lines are marked on the front plate, as shown in Fig. 12.

Each totalizer comprises two frames, an upper, containing the tens carrying devices and a lower, containing the total wheels, the numeral dials and their intermediate gears. The upper frame is slidingly mounted on two of the shafts 206ª which act as space rods for the side plates 200, as mentioned above, and the lower frame is movably connected to the upper frame, to be moved to mesh the total wheels with the rack bars. The upper frame consists of the side plates 206, spaced apart by the rod 206ª and the rods 238, and the lower frame consists of the side plates 210 spaced apart by the shafts 247, 248ª, 231ª and 235. These shafts also serve other purposes as will appear hereinafter.

Manually operable set knobs 202 are adapted to shift the totalizers laterally to thereby bring them into operative relation with the rack bars 152ª and 152ᵇ and also into operative relation with the device which connects or meshes the total wheels with the rack bars. The totalizers Nos. 1, 2 and 3 are adapted to be shifted or set in position to be operated for "multiplication or clearing". The No. 4 totalizer is adapted to be shifted in position to be operated for "entering", that is, have an item representing the dividend, registered therein, or in position to be operated for "division", which operates the multiplying devices in the ordinary manner, but rotates the total wheels in reverse direction to the "entering" rotation of same. On the rear end of a knob-shaft 203 a pin 204 is eccentrically mounted and engages a slot in a plate 205 mounted in the right side plate 206 of the upper totalizer frame and extends through an opening in the right totalizer frame plate 200ʳ. The plate 205 has three V-shaped notches on its upper edge and, with the totalizer in normal or neutral position, the center notch is engaged by a latch pawl 207 fulcrumed on the frame side plate 200ʳ, and this pawl is actuated by the spring 208 connected thereto (see Fig. 11). An indicator or pointer 209 is mounted on each set-knob and coöperates with the lettering on the front plate 7 of the casing 6. When a set-knob 202 is operated to set the indicator 209 to "multiplying", the respective totalizer is shifted to bring the total wheels into operative relation to the rack bars 152ª and when set to "clear", it is shifted to bring them into operative relation to the rack bars 152ᵇ. In Fig. 10, a total wheel of No. 3 totalizer is shown in operative relation to a rack-bar 152ᵇ and a total wheel of No. 4 totalizer is shown in operative relation to a rack bar 152ª. Figs. 27, 28 and 29 are details showing the various positions assumed by the total wheels relative to the rack bars. It will be observed that, in normal or neutral position, as shown in Fig. 27, the total wheels are in position to coöperate with both racks of a set, *a* and *b*, but in this position the means that move them into mesh are ineffective, as will presently be described. Fig. 28 shows the total wheels in operative relation to the rack bars 152ª, and Fig. 29 shows the total wheels in operative relation to the rack bars 152ᵇ.

The connecting device.

As stated above, a totalizer comprises two frames, an upper and a lower frame. The lower frame, containing the total wheels, is connected to the upper frame by links 211 and by levers 212 and is adapted to have rearward movement to move the total wheels into mesh with the rack bars (see Fig. 21). The levers 212 are tight on the shaft 212ª, and the left hand lever 212 has a rearward extension 212ˣ adapted to be engaged and moved by a pin 213 on a plate 214 slidingly mounted on the left side plate 155 of the rack bar frame. (See Figs. 7, 10, 19 and 48.) There are four pins 213 mounted on the plate 214, one for each of the four levers 212. The pins 213 have a slot on their upper edge and when the totalizers are in neutral position, the extensions 212ˣ of the levers 212 are positioned over this slot as shown in Fig. 32, so that upward movement of the pins will not affect the levers. When a totalizer has been shifted and set in position for an operation, the extension 212ˣ of the lever 212 thereon, will be positioned aside of the slot in the pin 213 and will then be in position to be moved by the pin to thereby mesh the total wheels of the totalizer with the rack bars. Pins 215 are mounted on the plate 214 above the pins 213 to re-set the levers 212 and thereby disengage the total wheels from the rack bars. The plate 214 is slidingly mounted on the frame side plate 155, by screws 214ª entering through slots in the plate. A link 216 is connected to the plate and to a lever 217 fulcrumed on the side plate 155, and a link 218 connects this lever to a lever 219 on a shaft 220 mounted in the brackets 26 and 92, Figs. 13, 14, 15 and 48. The link 218 is subject to disconnection from the lever 219 during clearing operation, as will be described hereinafter, but during such period it is held in position by a pawl 226 engaging the pointed end of the lever 217 and locking the same against undesired movement. A lever 221 on the shaft 220 is connected by a link 222 to the cam lever 223 mounted on the stud 124 in the bracket 53ʳ. By means of two anti-friction rollers mounted on the lever, the lever is actuated by the cam disks 224 and 225 mounted on the main shaft. The cams on said disks are so timed that, immediately upon rotation of the main shaft, the plate 214 carrying the pins 213, will be actuated and thereby move into mesh the total wheels of any totalizer or totalizers whose lever or levers 212 has or have been set in operative relation to a pin or pins 213. At 90° rotation of the main shaft the cam disks will disengage the total wheels and at 180° rotation will reëngage them, and at 270° rotation again disengage them.

In a preceding paragraph, it has been shown that the actuation of the rack bars takes place in four periods, each covering 90° of the main shaft rotation. During the first period the rack bars are moved from normal postion or set, and during the second period are re-set and during the third period are again set, and during the fourth period are finally re-set. The connecting devices for the total wheels are therefore arranged to connect or mesh the total wheels during the first and third or the setting periods of the rack bars and to disconnect them during the second and fourth or re-setting periods thereof. The periods of disconnection of the total wheels are utilized for the actuation of the tens carrying devices.

The carrying devices.

To the left side of each total wheel 231 a set disk 232 is mounted and has a set projection or cam 233 for every tenth tooth of the total wheel (see Figs. 19 to 28). The set projection or cam 233 has a concentric step to cause a period of rest or idling of the part provided to be actuated by the cam. A set pawl 234 is provided for each total wheel except the left-hand one and is mounted on a shaft 235 in the lower section of the totalizer, and is adapted to be actuated by set projections or cams on the set disk 232 of the total wheel. The pawl is held in contact with the set disk by a spring 236 connected thereto. A carrying rack 237 is provided for each total wheel except the right hand one and they are slidingly mounted on the grooved shafts 238ª and 238ᵇ which also serve as spacing rods for the frame side plates. The lower ends of the carrying racks have gear teeth to mesh with the total wheels and the movement of the racks is limited to one tooth or one lineal pitch. The spring 236 connected to a set pawl has its other end connected to the carrying rack coöperating with the total wheel to the left of the one with whose set disk this set pawl is coöperating. Each set pawl has a rear extension 234ˣ, and a pin 239 therein normally engages a lock surface 240 on the carrying rack to the left thereof and holds it against movement by its spring. A lock lug 241 is fulcrumed on the pin 239 and a slot in this lug engages a pin 242 in the carrying rack to the left thereof, that is, the same carrying rack which is held in normal position by the pin 239 of this pawl. The upper end of this lug engages a lock projection 243 on the carrying rack to the right of the aforesaid one (see Figs. 22 and 23). A lock rack 244 is provided for the first right hand total wheel to lock the total wheel against rotation when the totalizer is in normal position. The lock rack 244 is mounted on the shafts 238ª and 238ᵇ, and the shaft 238ª is turned down to enter the hole in the rack, and a set collar 244ª holds the rack in position (see Figs. 51 and 56.) Normally parts are as shown in Fig. 19, and Fig. 20 shows the lower totalizer frame moved to engage the total wheels with the rack bars 152, and disengaged from the carrying racks 237. In this position, rotation of a total wheel of a multiplying totalizer to nine position, causes a set projection 233 to actuate or raise the set pawl to the first step, as shown in Fig. 20, and thereby the pin 239 on the extension 234ˣ of the set pawl is moved off of the lock surface 240 on the carrying rack for the adjacent total wheel of next higher order than the one rotated. This carrying rack, however, is still held against setting movement by the lug 241 on the set pawl engaging the lock projection 243 on the carrying rack belonging to the total wheel of lower order, that is, the one rotated. If now this total wheel is rotated one more tooth, that is, from nine position to 0 position, the set projection thereon will again actuate the set pawl, and the lug 241 thereon is thereby moved to clear the projection 243 on the carrying rack belonging to the total wheel rotated, thereby releasing the carrying rack to move one tooth. When a carrying rack has been moved and set, it, or rather the projection 243 thereon, no longer serves as a lock for the lug 241 on the set pawl which controls the carrying rack of next higher order. In this instance, therefore, the carrying rack of higher order will be moved and set as soon as the total wheel, belonging to the carrying rack of lower order, arrives in nine position; thereby actuating the devices as described.

After the total wheels are disengaged from the rack bars and reëngaged with the carrying racks, such of the carrying racks as have been set to carry, will be re-set, thereby rotating or carrying the total wheels engaged therewith. From the foregoing it follows that a total wheel will receive carrying movement, first, when the total wheel of next lower order is rotated to or past zero position; second, when the total wheel of next lower order is moved to 9 position and also becomes subject to carrying movement by reason of the rotation of the total wheel to the right of it, to or past the zero position as, for instance, the total wheel standing at 3 in the following example:

```
    348
     54
    ----
    402
```

To indicate the position of the total wheels, visible dials 245 are mounted on the shaft 246 in the lower frame, and are driven by a ten tooth pinion 247 which is connected by the gear 248 to the total wheel 231. (See Fig. 19). For every tooth of the pinion, a visible numeral is provided on the periphery of the dial, and for the multiplying totalizers, the numerals are arranged on the dials as shown in Fig. 25, and for the dividing totalizer, they are arranged as shown in Fig. 26. The total wheels of the multiplying totalizers are in zero position when the set pawl abuts the set projection, as shown in Fig. 19, and the total wheels of the dividing totalizer are in zero position when the set pawl rests on the first step of the set projection.

In front of the total wheel dials and on the lower frame of each totalizer, a plate 249 is mounted for the purpose of indicating, by a mark thereon, the decimal point position, so that the fractional part of the total can readily be determined and read. This mark is affixed between the second and third right hand total wheel, as the two right hand total wheels are reserved to represent the fractional parts of a total.

*The actuating device for the carrying devices.*

To actuate and thereby re-set the carrying racks 237 of a totalizer, the rear extensions 237ˣ thereof are arranged to be actuated by a plate 256 mounted in the plates 257ʳ and 257ˡ. (Figs. 10, 11 and 19.) The upper ends of these plates are slidingly mounted on the outside of the side plates 154 and 155 of the rack bar frame and the lower ends of the plates are connected to levers 258 and 259 mounted on a shaft 260, extending through the frame side plates 154 and 155. The lever 258 has a rearwardly extending arm 258ª and a link 261 is connected to this arm and to a bell crank 262 fulcrumed on the side plate 154. A link 263 connects to the other arm of said bell crank, and to a lever 264 mounted on a shaft 265 in the brackets 26 and 92. This lever 264 has an L-shaped slot, and a pin 266 on the link normally engages the horizontal part of the slot, thereby establishing operative connection of the lever and the link. A lever 267 is mounted on said shaft 265 and a link 268 connects it to the cam lever 269 fulcrumed on the bracket 61ʳ. (See Fig. 11). This lever is operated by the cam 270 on the main shaft by means of an anti-friction roller 269ª, and a spring 271 connected to the lever tends to hold it in engagement with the cam. The cam is timed to actuate and re-set the carrying racks during the second and fourth periods of the main shaft revolution, that is, during the period in which the rack bars are re-set and the total wheels are out of engagement therewith.

The alining device for the rack bars.

In order to aline the rack bars 152$^a$ and 152$^b$ in actuated position, so that the total wheels in mesh therewith are likewise alined, and therefore, will readily reëngage their respective carrying racks, an alining device is provided. (See Figs. 7 and 14). The extensions 152$^x$ of the rack bars 152$^a$ have angular notches on their rear edge, and an alining plate 276 is mounted in an oscillatable frame 277 fulcrumed in the frame plates 154 and 155 and is adapted to enter the notches in the extensions 152$^x$ to thereby aline and lock the rack bars. On the left end of the frame shaft 277$^a$ a lever 278 is mounted and connected by a link 279 to a lever 280 fulcrumed on the side plate 155 (see Fig. 16). To this lever 280 a link 281 connects, and on the lower end of this link is a pin 282 which normally engages the horizontal portion of an L-shaped slot in a lever 283 mounted on the stud 283$^a$ in the bracket 92. (See Figs. 13 and 14). On the same sleeve with the lever 283 is a lever 284, and a link 285 connects this lever to a lever 286 pivotally mounted on the bracket 53$^1$. On the same sleeve with the lever 286 is a lever 287 mounting an anti-friction roller 287$^a$ adapted to engage a cam disk 288 mounted on the main shaft. (See Figs. 13 and 50). The cams on the cam disk 288 are so timed that when the rack bars assume actuated position, the alining device is momentarily actuated and will then release the rack bars for return movement.

The operating bar.

The function of the operating bar is to reset the item register and when operated in conjunction with the clearing key, to clear the totalizers. The operating bar 290 is attached to a lever 291 which is fulcrumed on the bracket 74 and a spring 291$^s$ holds it in normal or raised position (see Fig. 46). A link 292 connects the lever 291 to a lever 293 horizontally movable on the stud 294 screwed into the base casing (see Figs. 5, 14 and 45). A lever 295 on the same sleeve with the lever 293 carries a pin 296 which engages a groove in the hub of the gear 297 which is slidingly mounted on the stud 298 in the bracket 61$^1$. This gear 297 is permanently in mesh with a gear 299 rotatingly mounted on the stud 299$^a$ in the bracket 61$^1$. A lock disk 301 having a V-shaped lock notch is mounted on the hub of the gear 299 and a lock lever 302 having a spring 303 connected thereto engages the lock-notch in said disk by means of an anti-friction roller thereon and locks it in normal position. A gear 300 is tight on the main shaft and is located adjacent to the shiftable gear 297. The operation of the operating bar will shift the gear 297 into mesh with the gear 300, and simultaneously therewith operate the main shaft clutch to cause rotation of the main shaft 53. An arm of said horizontally mounted lever 295 extends through a slot in the bracket 61$^1$ and rests against the arm 63$^a$ of the lever 63, which actuates the main shaft clutch (see Figs. 5, 6 and 45). The gears 299 and 300 have a like number of teeth and therefore one revolution of the main shaft will rotate the gear 299 one revolution.

A lock is provided to lock the sliding gear 297 in set or engaged position until the main shaft has completed a revolution. A lock disk 323 is mounted on the main shaft and a lock pawl 324 is pivoted on a stud 324$^a$ in the bracket 53$^1$. An anti-friction roller 324$^b$ on the rear arm of this pawl normally engages a V-shaped notch in the lock disk 323 and a spring 324$^s$ connected to the pawl tends to hold it in normal position. The forward extending arm of the pawl 324 is adapted to coöperate with a projection 325 on the upper edge of the link 292 which is connected to the operating bar, as described (see Figs. 5, 6 and 49). When the operating bar is operated, the link 292 with the projection 325 is moved rearwardly and the thereupon following rotation of the main shaft will actuate the lock pawl 324 to move down and lock the link 292 in rearward position until the main shaft has completed a revolution.

Figure 8:
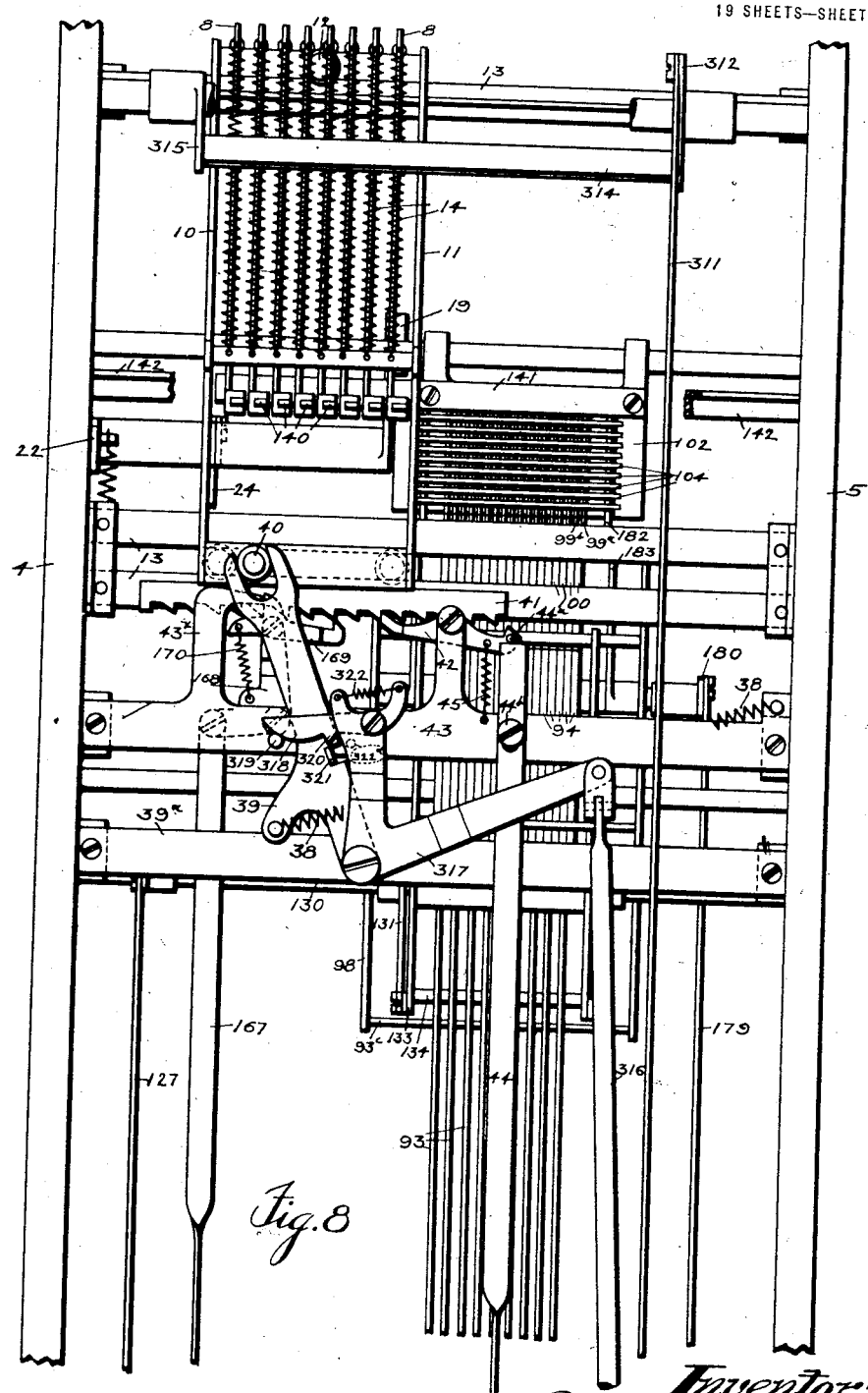
Fig. 8 is a rear elevation of a part of the machine, some parts being removed to show the register carriage and its propelling and resetting devices.

When the main shaft is rotated by the operation of a multiplying key, the lock pawl 324 will be actuated to move down to the rear of the lock projection 325 on the link 292 and thereby lock the operating bar against operation until the main shaft has completed one revolution. Riveted to the front surface of said gear 299 and forming a unit therewith, are cam disks 326 and 327 whose functions will be described hereinafter. A stud 304 is eccentrically mounted on the outer surface of said cam disk 327 and a link 305 connects thereto and to a lever 306 mounted on a sleeve fulcrumed in the small bracket 307 on the base casing. A lever 308 is mounted on the same sleeve with the lever 306 and a link 309 is connected thereto and connects to a bell crank 310 fulcrumed on the bracket 92. A link 311 connected to this bell crank extends upward and connects to a lever 312 mounted on a shaft 313 which is mounted in the main side plates 4 and 5. An arm 312$^a$ of the lever 312 extends forward and a flat bar 314 is mounted on this arm 312$^a$ and extends across the machine and is fastened to a lever 315 mounted on the shaft 313 and parallel to the arm 312$^a$. The bar 314 is adapted to be actuated by the means just described to engage the projections 8$^x$ of all the item members that are in set position, and to re-set them to normal or upper position (see Figs. 7 and 8). On the bell crank 310 which is mounted in the bracket 92, a rod 316 is mounted and the upper end of this rod connects to the bell crank 317, fulcrumed on the cross rail 39$^a$ (see Figs. 8 and 14). The other arm of this bell crank carries the resetting pawl 318 for the carriage. Normally, the position of the pawl is as shown in Fig. 8. The front end of the pawl is provided with a cam surface which normally rests on the pin 319 on the cross rail, thereby raising the tooth 320 of the pawl out of engagement with the projection 321 on the lever 39 which moves the carriage as previously described. A spring 322 connected to the pawl tends to move it into engaging position against the stop pin 322$^a$ on the lever 317. The parts are so arranged that the first one-half revolution of the main shaft will re-set the item members to their upper or normal position and simultaneously therewith the re-setting pawl 318 is moved to extreme left position; and during the second half revolution of the main shaft the pawl will engage or pick up the carriage at whatever position it may be, and return it to normal position.

*The clearing device for the totalizers.*

A clearing device for the totalizers is provided, to re-set the total wheels to normal or zero position. In principle, it operates as follows: The setting of a clearing key connects a rocking frame to the main shaft, and a series of springs is connected to the rocking frame and to a series of members adapted to actuate the rack bars 152, which in turn actuate the total wheels to be cleared.

The totalizer to be cleared is set to clearing position and in this position the total wheels thereof are in position to engage the rack bars 152$^b$, which are adapted to rotate them in clearing direction until the set projections on the total wheels abut the set pawls 234 of the carrying device. The aforesaid rocking frame, which is actuated in the course of clearing operation, is arranged to be actuated in one direction during the first one-half revolution of the main shaft, and to be re-set during the second one-half revolution thereof. The rack-bars 152, which are actuated by the rocking frame during clearing operation, are therefore likewise actuated once during one main shaft revolution as compared with the two actuations thereof during one main shaft revolution when multiplying operation takes place. This condition necessitates that the "connecting device for the totalizers", the "alining device for the vertical racks", the "actuating device for the tens carrying devices", and the "re-setting device for the rack bars" be disconnected or have their functions modified during clearing operation.

As hereinbefore stated, the actuation of the operating lever establishes gear connection between the gear 300 on the main shaft and the gear 299 on which the two cam disks 326 and 327 are mounted. A link 328 is connected to the stud 304 which drives the link 305 which re-sets the item registers, as previously described. (See Figs. 5 and 13.) The rear end of the link 328 carries a pin 329 which is adapted to engage a short slot in the lever 330 mounted on the stud 176$^a$. Normally, the pin is above the slot as shown in Fig. 13, and in this position the actuation of the link 328 will not actuate the lever 330. Near the pin 329, a link 331 connects to the link 328 and extends up to the rear arm 332$^a$ of a lever 332 fulcrumed on the small bracket 333 mounted on the top of the cover of the base casing. Another link, numbered 334, is connected to the rear arm 332$^a$ of the lever 332, and to the link 177 which connects to the bell crank 178, which forms a part of the re-setting devices for the product plates and the rack bars, as previously described. The forward extending arm of the lever 332 has a projection 332$^b$ which normally is engaged by a pawl 335 mounted on the bracket 333, and a spring 336 connects to the pawl and to a downward extending arm of the lever 332. A clearing key 337 is mounted on the push rod 338, mounted on the top of the base casing, and the rear end of the rod is guided in the bracket 333 and engages the lower arm of the pawl 335. The operation of the clearing key moves the pawl to release the lever 332 to move under the impulse of the spring 336, and to connect the link 328 with the lever 330 and to disconnect the link 177 from the bell crank 178. The link 177 is an element of the "re-setting device for the rack bars", as hereinbefore described, and the setting of the clearing key, therefore, disconnects this device by the means just described. A link 339 is connected to the lever 332 and to a cam lever 340 fulcrumed on the bracket 53$^1$, and an arm 340$^a$ of this lever extends up through a slot in the cover of the base casing. A cam 341$^a$ on the cam disk 341, mounted on the main shaft, is adapted to actuate the front arm of the lever 340 when the lever has been moved or set by the operation of the clearing key; such actuation is timed to occur near the end of a main shaft revolution, and will re-set the lever 332 and the parts connected thereto to normal position. A link 342 is connected to the lever 330 and extends up to connect to the lever 343 tight on the shaft 344 mounted in the frame side plates 148 and 149 (see Figs. 3, 10 and 16). Two levers 345 tight on the shaft, together with the shaft 344, form a rocking frame, supporting a shaft 346 to which a series of normally closed tension springs 347 are connected. The other ends of these springs connect to a series of levers 348, loosely mounted on a shaft 349, mounted in the frame side plates 148 and 149, and these levers are adapted to engage pins 350 mounted on the links 145 which are actuated by the multiplying devices to actuate the rack bars, as hereinbefore described. The parts are so arranged that, when the clearing key is set and then the operating lever actuated, the resulting rotation of the main shaft will actuate the rocking frame 345 and through the medium of the springs 347 and the levers 348, the rack bars 152. Such of the total wheels as are in engagement with the rack bars 152$^b$ during such actuation, will be rotated in clearing direction until the set projections thereon abut the set pawls, and thereby assume normal or zero position. In the following paragraph I will describe how the "connecting device for the totalizers", the "alining device for the rack bars", and the "actuating device for carrying devices" are disconnected and re-connected.

Two levers 356 and 357 are mounted on the left end of the shaft 110 of the universal drive frame 109, and are adapted to be operated by the two cam disks 326 and 327, respectively. These cam disks are riveted to the gear 299 as hereinbefore described. From the cam lever 356 a link 358 connects to the lever 359, tight on a shaft 360, which is mounted in the main side plates 4 and 5, and a spring 367, connected to the lever, tends to hold it in normal position (see Figs. 13 and 14). The link 358 has a widened portion near the rear end and a vertical slot in this portion engages the pin 282 in the link 281 which link is an element of the alining device for the rack bars. A lever 362 is tight on the shaft 360 and a slot therein engages the pin 218$^a$ on the link 218, which link is an element of the totalizer connecting device. A lever 363 (see Fig. 5) is tight on the shaft 360 and a slot therein engages the pin 363$^a$ on the link 263 (see Fig. 13) which link is an element of the actuating device for the carrying devices. From the lever 357 a link 364 connects to a lever 365 loosely mounted on the shaft 360, and a forward extending arm of this lever has a slot which engages a pin 366 on the link 281 which connects to the alining device for the rack bars (see Fig. 16). A spring 367 connected to this lever tends to hold it in normal position.

The cams on the cam disks 326 and 327 are timed to operate as follows: Upon actuation of the operating lever, and after the clearing key has been set, the main shaft will rotate and connect or mesh any totalizer that has been set to clearing position, and also will commence to actuate the rocking frame 345. Next the cam disk 326 will actuate the lever 356 to disconnect the link 218 of the totalizer connecting device, the link 263 of the actuating device for the carrying devices and the link 281 of the alining device for the rack bars. The further rotation of the main shaft and the gear 299 to 180° from normal position will actuate the rocking frame 345 to its extreme position, and rotate the total wheels in mesh with the rack bars to zero position. At this point, the cam disk 327 commences to actuate the lever 357 to thereby actuate the link 281 of the alining device, to aline and lock the rack bars in actuated position, and to hold them in this position for a time. Shortly before the main shaft and the cam disk 326 have rotated 270°, the cam disk releases the lever 356, and the spring 361 will reset it and thereby reconnect the totalizer connecting link 218, the actuating link 263 of the carrying devices, and the alining link 281 for the rack bars. At 270°, the connecting device for the totalizers will be actuated to disconnect the totalizer and right thereafter the cam disk 327 will release the lever 357, and the spring 367 will reset it and thereby release the alining bar from the rack bars, which, under the impulse of the springs 150, will move to normal position. Near the end of the main shaft revolution, the clearing key will be reset as hereinbefore described.

Controlling Devices.

*The set lever for the typewriter keys.*

A manually operable set lever 371 protrudes through a slot in the front end of the cover for the base casing and is adapted to be shifted to be set to three positions, and these three positions are indicated by the words "Write", "Write and register", and "Write and multiply", on the cover adjacent to the slot. (See Figs. 2, 4 and 17). To set the machine to perform the desired operation, the lever is set opposite the word denoting the operation. The lever 371 is fulcrumed on the bracket 372 and a link 373 connects it to a lever 374 fulcrumed in the upright 35. The upper arm of the lever 374 engages a slot in a three-armed lever 375 fulcrumed on a stud 375$^a$, mounted on the upright 35. On the rear arm of the lever 375 is a pin 376 which engages a groove in the shaft 29 on which the cam levers 30, which actuate the item register, are mounted (see Fig. 53). The front arm of this lever 375 is connected to the shaft 81 on which the cam levers 80, which actuate the multiplying devices, are mounted. The manually operable set lever 371 mounts two pins 377 near its upper end, and a latch pawl 378, fulcrumed in the bracket 372, coöperates with these pins to hold the lever in the position it is set. A spring 379 is connected to the pawl and tends to hold it in engagement with the pins 377. The parts are so arranged that when the set lever 371 is in normal or neutral position, which is indicated by the word "Write" on the cover, the cam levers 80 and 30 on the shafts 81 and 29, respectively, are out of operative relation with the rollers on the stems 31, which are operated by the typewriter numeral keys. With the parts in this position, the operation of the typewriter numeral keys will move the stems 31 ineffectively. Setting the set lever to "Write and register" will shift the cam levers 30 on the shaft 29 into operative relation with the rollers or stems 31, so that in this position the typewriter numeral keys, when operated, will register the item printed. Setting the set lever to "Write and multiply" will shift the cam levers 80 on the shaft 81 into operative relation with the rollers on the stems 31 so that the operation of the typewriter numeral keys will cause such multiplying devices to be actuated as correspond to the item printed.

*The special tabulating key.*

The two right hand total wheels of all the totalizers are preferably arranged to represent the fractional parts of dollars, pounds, etc., and therefore, a decimal point mark is shown on the decimal point plate of the totalizers and is placed between the second and third dials of the total wheels (see Fig. 12). In order that the products, totals or remainders, shown on the totalizer dials, are shown with the decimal point in proper position, certain rules govern the operation of the machine. The multiplication of two items representing entire quantities will produce a product representing an entire quantity. For instance, 372 by 591=219852. Since the totalizers have the two right hand total wheels reserved for the possible fractional parts, the total would appear therein thus—219852.00. From this it is apparent that the multiplication of the item 372, with the first or highest figure of the multiplier, *i. e.*, 5, must commence with the first or highest figure of the item, *i. e.*, 3, in the eighth decimal order counted from the right end. This requires that the item representing the multiplicand, which is entered in the item register, be set with its left figure to the eighth decimal order position before commencing multiplication, thus:

0000000.00—Totalizer for the product.
372000.00—Multiplicand set up in the register and positioned.

To accomplish this without mental effort, certain operating devices and rules governing the operation of same are provided and can best be described and explained by the aid of an example. For instance, 372 bbls. @ 591.00=219852.00

The typewriter is operated to write "372 bbls. @," and the machine is set to simultaneously therewith register the item "372" in the item register, which will then stand with its left figure in the third decimal order, thus—

0000000.00—Product totalizer,
3 72—Multiplicand register.

A special tabulating key is provided to simultaneously escape the typewriter platen and the item register carriage, and the rule is established that this key is operated to escape the platen to bring the decimal point position of the multiplier to printing position and to escape the register two places. Therefore, upon operation of this key, the platen is escaped to decimal point position, and the item register is escaped two units to the left, and the register now stands thus—

0000000.00—Product totalizer,
372 00—Multiplicand register.

In order to print the item "591." in its proper position, to the left of the decimal point, to which position the platen has been escaped, the platen must be back-spaced three spaces, and the operation of the typewriter back-space key, provided for this purpose, will, by reason of devices adapted to be operatively connected thereto, and described hereinafter, escape the item register a unit movement for each and every operation of the back space key, and in the instance of the above example, the three operations of the back space key will position the item register thus—

0000000.00
372000 00

The machine is now set in position to "write and multiply," the typewriter numeral keys are operated to write the item "591.00;" thereby actuating the multiplying devices to multiply by "591" and the product "219852.00" will appear in the totalizer in the proper decimal order.

When the multiplier contains only two figures to the left of the decimal point, the typewriter back-space key is operated only twice, and the item register is thereby escaped only two units. When the multiplier contains no significant figure to the left of the decimal point as, for instance, .059, the platen is escaped to the decimal point position by the operation of the special tabulating key; then the decimal point is printed and then the 0 key, the 5 key, and the 9 key are actuated to multiply and will bring the product in proper decimal order; for instance, 372 by .05

| | |
|---|---:|
| | 0000000.00 |
| Position of item register after registering the item | 372 |
| Position of item register after the operation of the special tabulating key | 372 |
| Position of item register after the operation of the 0 key | 372 |
| Operating the 5 key | 131 |
| | 550 |
| Product | 18.60 |

On the right end of the shaft 29, on which the cam levers 30 are mounted, is a lever 381, and a link 382 connects the lever 381 to a lever 383, fulcrumed on the bracket 372. (See Figs. 4 and 17). On the upper edge of the forward extending arm 383ª of the lever 383 is a cam projection 383ᵇ adapted to be operated by a cam projection 385ᵇ on the downward extending arm 385ª of a key lever 385, which is mounted on the shaft 386 in brackets 387 and 388 mounted on top of the cover. A spring 384 is connected to the lever 383 and tends to hold it in operative connection with the key lever 385 and a spring 389 is connected to the key lever 385 and tends to hold it in normal position. A lever 390 is mounted on the shaft 386 and carries a pin 390ª which rests on the upper edge of the typewriter tabulating key 392. The key lever 385 has a finger plate 385ᶜ and this plate is marked "Sp. Tab.", which stands for "Special tabulating." The down-stroke of the special tabulating key 385 causes one oscillation of the lever 383 and of the cam lever shaft 29 and also actuates the typewriter tabulating key 392 to perform its customary function of escaping the platen; the up or return stroke of the key causes another oscillation of the lever 383 and of the shaft 29.

As stated in a previous paragraph, the oscillation or angular movement of the cam lever shaft 29 is divided into ten space units and the first space unit movement from normal position causes the item register carriage to be escaped one-half unit movement and the return movement of the lever-shaft of this space unit movement will cause the carriage to be escaped the other one-half unit movement. The two oscillations imparted to the shaft 29 will therefore escape the item carriage two units.

*Unit escaping key.*

In the course of various operations it is desirable to escape the item register carriage single unit movements at a time, and, therefore, a unit escaping key is provided. (See Fig. 17). A key 396 marked "Esc." extends through the casing cover and the upper end of the key stem 396ª is guided by a hole in the casing cover, and a slot in the lower end of the stem engages a pin 397 on the lever 383. The operation of the escaping key 396 oscillates the lever 383 and the shaft 29 once, and, therefore, causes the item register carriage to escape one unit.

*The connection from the typewriter back-space key to the item register.*

For purposes hereinafter described, it is desirable that the typewriter back-space key, which back-spaces the platen, shall have connections adapted to be set to escape the item register carriage one unit whenever the typewriter back-space key is operated. As the construction of the typewriter back-space device does not form a part of this invention, and is of the standard Underwood typewriter design, as illustrated in Helmond Patent No. 930,962 dated August 10, 1909, it is not shown and described in this application; only so much of it being shown as is necessary to clearly show the coöperation of it with the other parts of the machine. Underneath the rear part of the typewriter is a link 400 which is an element of the typewriter back-space device and is moved by the operation of the typewriter back-space key (not shown) in the ordinary manner.

A lever 401 on a shaft 402 mounted in brackets 403 and 404 has a bent-off portion, which underlies and touches the link 400 and is adapted to be moved upon movement of the link 400. A lever 404ª on the shaft 402 has a link 405 connected thereto and the front end of this link is bent off to offer a wider surface to the upper end of the lever 381 on the cam lever shaft 29 which is actuated to escape the item register carriage as described. A spring 406 is connected to the lever 404ª and tends to hold it and the parts connected thereto in normal position. The parts are so arranged that an operation of the typewriter back space key will oscillate the shaft 29 to an extent to escape the item register carriage one unit. To set the parts in position so that the typewriter back-space key can be operated without affecting the item register carriage, the link 405 is adapted to be set in ineffective position to actuate the lever 381. A manually operable lever 407 is fulcrumed on a bracket 408 on the top of the base cover and the rearward extending arm 408ª carries a pin 409 which engages a slot in the link 405. A retaining pawl 410 mounted on the bracket 408 coöperates with the pin 411 on the lever 407 to hold the lever 407 in whatever position it is set, and a spring 412 connected to the retaining pawl tends to hold it in engagement with the pin 411 on the lever 407. The parts are so arranged that when the lever 407 is operated to set the link 405 in ineffective position, the front end of the link 405 is raised and in this position it will clear the lever 381.

*The set lever for multiplication and addition.*

It has been hereinbefore described how, in the course of multiplication, the item register carriage is back-spaced one unit movement between the delivery of the tens values and the delivery of the units values. In the course of addition, subtraction, and division, however, it is preferable that the back spacing of the carriage does not take place as above stated, and therefore a set lever is provided which is manually settable, to set the means to back-space the item register carriage in ineffective position, when so desired. The following example of addition will explain the aforesaid: Assume the four right hand total wheels of a totalizer to be standing in this position 0000086.73 and we wish to add 54.28

The item "54.28" is registered in the item register, and the register will then stand in operative relation with the total wheels, as shown; that is, the first left hand item member will be in operative relation with the fourth right hand total wheel. This is the proper adding position of the item "54.28" and to add this item, the set lever is actuated to set the carriage back-space device in ineffective position and the multiplying key carrying the numeral 1, is then operated. The multiplying devices connected to this multiplying key will move to deliver the tens values of which, of course, there are none, and then will move to deliver the units values, which equal 1×54.28. If, however, the carriage had been back-spaced between the delivery of the tens and units values, the units values would not have been delivered in the proper decimal order, as shown, but in the next lower decimal order, to the right thereof.

The manually operable set lever 415 is fulcrumed on the bracket 372 and an arm 415ª thereof extends through a slot in the casing cover. (See Fig. 17). Adjacent to the slot, the cover is marked "Mult. and add.", which stands for "Multiplication and addition", and to set the machine to perform the desired operation, the lever is set opposite the word denoting the operation. A link 416 is connected to the lower arm 415ᵇ of the lever 415 and to a lever 417 on a shaft 418 mounted in the brackets 53ʳ and 61ʳ (see Figs. 5 and 15). A lever 419 on the shaft 418 is connected by a link 420 to the link 164 which actuates the item register carriage back-space device, as described. Normally, the parts are as shown in Fig. 15, and upon setting the set lever to "Add." position, the link 164 will be moved down to disengage from the pin 165 on the cam lever 162, thereby leaving the cam lever to be ineffectively actuated by the main shaft.

OPERATION OF MACHINE.

*Back-space key.*

Figure 15:
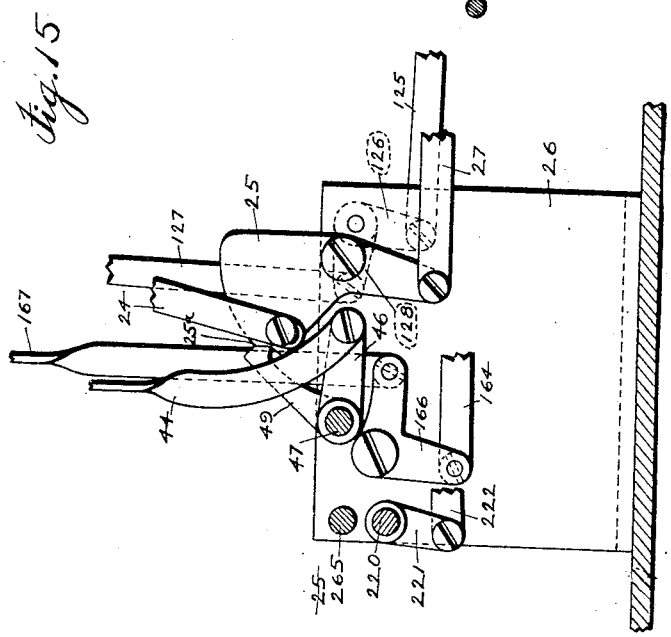
Fig. 15 is a section on the line A—B of Fig. 5.

In the course of the dividing operation, it is desirable to back-space the item register carriage manually, and for that purpose a back-space key 421 is provided and is fulcrumed on a bracket 422 on the cover of the base section (see Figs. 15 and 17). A link 423 connects the key to the upper end of the link 420 which extends through a slot in the casing cover and which is connected to the link 164 which actuates the back-space device of the item carriage, as hereinbefore stated.

*Division.*

The ordinary method of division is to estimate the first figure of the result, to multiply the divisor by this figure, and to subtract the product from the dividend, etc. This method of division is performed with the machine as follows: Assume the example 21482÷934.

| | |
|---|---|
| Normal position of dividing totalizer | 000000000 |
| The dividend is entered into the dividing totalizer | 000021482 |
| The divisor is registered in the item register and set under the left hand figure | 93400 |
| Operation of No. 2 mult. key  {tens values | 100 |
|                                {unit values | 868 |
| Balance in total wheels | 000002802 |
| The divisor has been moved to the right | 9340 |
| Operation of No. 3 mult. key  {tens values | 201 |
|                                {units values | 792 |
| Final position of total wheels | 000000000 |

The dividend "21482" is registered in the item register, the dividing totalizer is set to "Enter", that is, in position to receive positive movement; the set lever is set to "Mult." position, and the number 1 multiplying key is operated to multiply "21482" by 1 into the dividing totalizer. The item register is now cleared by operating the operating lever, and the totalizer is set to dividing position. The divisor "934" is now registered and moved two units to the left to bring the "9", the first figure of the divisor, into the fifth decimal order under the "2", i. e., under the first figure of the dividend. The first figure of the result is estimated to be "2", and therefore, the No. 2 multiplying key is operated to actuate the multiplying devices and to rotate the total wheels in reverse direction to the extent of the product of "2×934"; i. e., subtract "2×934" from the dividend. The balance shown by the total wheels indicates that the next figure of the result may be "3", and the No. 3 multiplying key is actuated; this leaves the total wheels in zero position, and, therefore, "23" is the result.

In practice, it is preferable to enter the dividend into total wheels of higher order, so that a number of ciphers are added, to thereby be enabled to continue the division for the purpose of obtaining fractional parts of the result. To avoid the mental effort of estimating the figures of the result, division can be accomplished by repeatedly subtracting the divisor. In the instance of the above example, the operation will be performed on the machine as follows:

| | |
|---|---|
| The dividend is entered into the dividing totalizer | 000021482 |
| The divisor is registered in the item register and positioned in the first unit position | 934 |
| The No. 1 mult. key is operated once and leaves the balance | 000012142 |
| | 934 |
| The No. 1 mult. key is operated again and leaves the balance | 000002802 |
| Inspection shows the necessity of moving the divisor to the right, thus | 934 |
| | 934 |
| | 000001868 |
| In this position the No. 1 mult. key is operated three times; | 934 |
| therefore, 3 is the second figure of the result. | 000000934 |
| | 934 |
| | 000000000 |

When commencing division by this method, the divisor is set with its first figure under the second figure of the dividend, and this position corresponds to the position in which the units values are delivered or withdrawn in the previous example, i. e., when division is done by the operation of the multiplying keys whose numerals correspond to the figures of the result. The set lever is set to "Add" position, thereby setting the device which back-spaces the register carriage, i. e., moves the divisor to the right, in ineffective position. The No. 1 multiplying key is now operated to subtract the divisor 934 as often as it is contained in "2148", and the number of operations of the No. 1 multiplying key for this purpose equals the first figure of the result, in this instance "2". To continue the division, it is necessary to move the divisor one figure to the right and the manually operable back-space key is operated once, to accomplish this. In this position the divisor can be subtracted three times and "3" is therefore the second and last figure of the result.

The dividing totalizer should preferably be mounted in the lowest position, as shown in the present machine. This position is nearest to the item register carrying the divisor, and this arrangement is desirable when performing division, which necessitates inspection of the dividend for the purpose of either estimating the figures of the result or determining the movement to the right of the divisor. To assist the eye in determining the decimal order in which the figures in the item register are, order lines are marked on the front plate, as shown in Fig. 12.

*Miscellaneous operations.*

It will be readily understood, that, by the means hereinbefore described, an item contained in the item register can simultaneously be added to one or more multiplying totalizers, and be subtracted from the dividing totalizer.

A total contained in a totalizer can be cleared out of the totalizer, and simultaneously added to or subtracted from another totalizer. The totalizer to be cleared is set to "Clear" position, and the totalizer which is to receive this clearing movement for any purpose, as, for instance, for adding it to a total contained therein, or for the purpose of subtracting it from a total contained therein, is set in operative position; the clearing key is set and the operating bar is operated. Both totalizers engage the vertical racks at once and disengage at 270° of main shaft rotation; the actuating device for the carrying devices commences effective actuation at 270° and performs such carrying as may be necessary.

An item contained in the item register can readily be multiplied by a number of multipliers. During the operation of multiplication, an item contained in the register is back-spaced and before multiplying the same by a second multiplier the register should be escaped or set with reference to the decimal point of the second multiplier, according to the rules set forth.

*Examples.*

The operation of the machine is illustrated by the following examples:

| | | | | |
|---|---|---|---|---|
| 2356 | 6 doz. shades | | @ 7.50 | 45.00 |
| 2835 | 3½ doz. " | | @11.50 | 40.25 |
| 2950 | 6 Axm. rugs ≠ 173 | | @18.50 | 111.00 |
| 3256 | 2 doz. curtains ≠ 256 | | @22.25 | 44.50 |
| 4650 | 4 9-12 Smy. rugs ≠ 98 | | @32.50 | 130.00 |
| | | | | 370.75 |
| | Less 33⅓ and 2½% | | | 240.98 |

The number "2356" is written, then the machine is set to "Write and register" and "6 doz. shades" is written; the totalizers Nos. 1 and 2 are set to "Mult." and the machine is set to "Write and multiply": the special tabulating key is operated to escape the platen to the decimal point position of the multiplier; the typewriter back-space key is operated to bring the "7" to the left of the decimal point; the No. 7 typewriter key is operated; the "period" key, which also serves as the decimal point key, is operated; then the "5" key and the "0" key are operated. The product "45.000" will be shown on the dials of the two totalizers Nos. 1 and 2. The No. 1 totalizer is set to clear, the clearing key is set, and the operating bar operated; thereby clearing the No. 1 totalizer and the item register. The other items are multiplied in the same manner, and then the No. 2 totalizer will show the grand total "370.75." This item, representing the total, is now registered; the No. 2 totalizer is set to clear; and the No. 4 totalizer is set to "Enter"; the No. 1 multiplying key is operated, and thereby the No. 2 totalizer is cleared, and the total is entered into No. 4 totalizer. During these operations, the item is retained in the item register, and is now multiplied into any totalizer by .65, which is the decimal equivalent of the chain discount "33⅓ and 2½%." The total, less discount, "240.98" is simultaneously written and registered and then subtracted from the total "370.75" contained in No. 4 totalizer, leaving the discount "129.77" displayed on the dials thereof. This may then be printed or transferred to another record and the totalizers are then cleared by the clearing device.

The following example requires three multiplying totalizers, two of which carry column totals, and is performed as follows:

```
27 bbls.   425 lbs.   11475 lbs.   4¼¢   487.68
15         375        5625         8½    478.12
60         350        21000        11½   2415.00
36         450        16200        7½    1215.00
                                          4595.80
              Less 12½ and 2½%..........  3920.21
```

The item "27 bbls." is written and registered; the special tabulating key is operated to escape the platen to the decimal point position in back of "425"; the typewriter back-space key is operated 3 times to position "425" to the left of the decimal point, which in this instance is not shown. The multiplying keys "4", "2" and "5" are operated to multiply 27 by 425 into Nos. 1 and 2 totalizers, the No. 2 totalizer serving as a totalizer for the column. The item register is cleared and the total "11475" is registered; the No. 1 totalizer is cleared by subtracting "11475" out of it, and then "11475" is multiplied by 4¼¢, that is, by .0425, into No. 1 and No. 3 totalizer; the No. 3 totalizer serving as a column totalizer. The total "487.68" is written and No. 1 totalizer and the register are cleared. The other items are handled in the same manner and No. 2 totalizer will then show the total pounds, and No. 3 totalizer the total amount. The chain discount "12½—2½%" can be deducted by multiplying the total by the decimal equivalent thereof.

The following example involves multiplication as well as division to obtain percentage cost and unit cost:

Job No. 257. No. of pieces 6250 plus 1 per cent.=6312 pieces.

| Operation. | Hours. | Rate. | Cost. | Pieces. | Per cent. cost. | Unit cost. |
|---|---|---|---|---|---|---|
| Rough grind | 85 | .18 | 15.30 | 6300 | 2.27% | |
| Turret lathe | 1275 | .32 | 408.00 | 6280 | 60.57% | |
| Drill | 735 | .25 | 183.75 | 6265 | 27.27% | |
| Tap | 165 | .25 | 41.25 | 6265 | 6.12% | |
| Japan | 115 | .22 | 25.30 | 6265 | 2.27% | |
| | | | 673.60 | | | .1075 |

Write and register "Rough grind"; tabulate to decimal point; write and multiply by ".18" into No. 1 and No. 2 totalizers; No. 2 totalizer carrying to column total. Write "6300", the number of pieces intact after this operation. Continue with the remaining items and the No. 2 totalizer will show "673.60". To obtain percentage cost, divide "15.30" by "673.60" and obtain "2.27%" = percentage cost. To divide, add three ciphers and proceed with division by subtraction.

Dividing totalizer _____ 0,015,300.00
Register _____ 673,600.00
673 is not contained in 15.
Operate back-space key and
 mark a zero _____ 0
673 is not contained in 153.
Operate back-space key and
 mark a decimal point and
 zero _____ 0.0
673 is contained in 1530.
Operate No. 1 multiplying key
 twice and mark a "2" _____ 0.02
Continue the division and obtain the result _____ 0.0227
Express this in percentage ____ 2.27%

Continue to obtain the percentage cost of the other items and then divide "673.60" by "6265", the number of pieces finished to obtain unit cost.

Dividing totalizer _____ 673,600.00
Item register _____ 6,265,000.00
6265 is not contained in 673.
Operate back-space key
 and mark a zero _____ 0
6265 is contained once in
 6736.
Operate No. 1 multiplying
 key once and mark a
 decimal point and a "1" _ 0.1
Operate back-space key
 and mark a zero _____ 0.10
Operate back-space key
 again and mark a "7" __ 0.107
Continue the division and
 obtain _____ 0.1075 unit cost.

I claim the following as my invention:

1. In a calculating machine, totalizing mechanism, an item register adapted to be set to represent an item, keys adapted to effect the printing of the numerals 0 to 9, respectively, and means adapted to be operatively connected with and disconnected from said keys to set the register, said item register constituting means for actuating the totalizing mechanism.

2. In a calculating machine, totalizing mechanism, an item register comprising item members adapted to be moved and set in proportion to the figures of an item, keys adapted to effect the printing of the numerals 0 to 9, respectively, and means adapted to be operatively connected with and disconnected from said keys to set the item members, said item register constituting means for actuating the totalizing mechanism.

3. In a calculating machine, multiplying devices corresponding to the numerals 0 to 9, keys adapted to effect the printing of the numerals 0 to 9, respectively, and means for actuating the multiplying devices, said means being adapted to be operatively connected with said keys to be actuated thereby simultaneously with the printing operation and being adapted to be disconnected therefrom without affecting the capacity of said keys to effect printing.

4. In a calculating machine, keys adapted to effect the printing of the numerals 0 to 9, respectively, multiplying devices corresponding to the numerals 1 to 9, multiplying keys corresponding to the numerals 1 to 9 normally operatively connected to the respective multiplying devices, and means adapted to be operatively connected with and disconnected from said first-mentioned keys to actuate the multiplying devices of corresponding numerals.

5. In a calculating machine, keys adapted to effect the printing of the numerals 0 to 9, respectively, multiplying devices comprising product plates representing the numerals 1 to 9, and means adapted to be operatively connected with and disconnected from said keys to cause simultaneous actuation of such of the product plates as correspond to the figures of the multiplicand.

6. In a calculating machine, keys adapted to effect the printing of the numerals 0 to 9 respectively, multiplying devices comprising product plates representing the numerals 1 to 9, and means adapted to be operatively connected with and disconnected from said keys to actuate the multiplying devices.

7. In a calculating machine, keys adapted to effect the printing of the numerals 0 to 9, respectively, multiplying devices representing the numerals 1 to 9, and means adapted to be operatively connected to the said keys and arranged to be effective upon operation of same to print, to actuate the multiplying devices corresponding to the number of the key operated, and multiplying keys representing the numerals 1 to 9, permanently operatively connected to the multiplying devices.

8. In a calculating machine, keys adapted to effect the printing of the numerals 0 to 9, respectively, an item register, multiplying devices, means adapted to be operatively connected with and disconnected from said keys to actuate the item register, and means adapted to be operatively connected with and disconnected from said keys to effect multiplying actuation of the multiplying devices.

9. In a calculating machine, keys adapted to effect the printing of the numerals 0 to 9 respectively, an item register, multiplying devices, means adapted to be operatively connected with and disconnected from said keys to actuate the item register upon operation of the keys to print, and means adapted to be operatively connected with and disconnected from said keys to actuate the multiplying devices upon operation of the keys to print.

10. In a machine of the character described, keys adapted to effect the printing of the numerals 0 to 9, respectively, an item register, multiplying devices, and means adapted to be operatively connected to the said keys to actuate the register and thereby set it into coöperative relation with the multiplying devices.

11. In a calculating machine, keys adapted to effect the printing of the numerals 0 to 9, respectively, an item register comprising item members adapted to be moved and set in proportion to the figures of an item, multiplying devices corresponding to the numerals 1 to 9, and means adapted to be operatively connected to said keys to actuate the register and set the item members to represent an item and thereby set the item register into coöperative relation with the multiplying devices corresponding to the figures of the item printed and registered.

12. In a calculating machine, typewriter numeral keys, an item register comprising item members adapted to be moved and set in proportion to the figures of an item, members movably mounted on said item members, multiplying devices corresponding to the numerals 1 to 9, and means adapted to be operatively connected with the typewriter numeral keys, to actuate said item register to thereby set the item members to represent an item, and to thereby set said movable members on the item members into coöperative relation with the multiplying devices corresponding to the figures of the item represented by the item members.

13. In a calculating machine, keys adapted to effect the printing of the numerals 0 to 9, respectively, an item register, means operatively connected to said keys to actuate the register, multiplying devices comprising product plates corresponding to the numerals 1 to 9, and means adapted to be operatively connected with and disconnected from said keys to effect actuation of the product plates corresponding to the figures of the multiplicand.

14. In a calculating machine, keys adapted to effect the printing of the numerals 0 to 9, respectively, an item register comprising members adapted to be moved and set in proportion to the figures of an item to thereby represent the multiplicand, means adapted to be operatively connected with and disconnected from said keys to set the members, multiplying devices comprising product plates corresponding to the numerals 1 to 9, and means adapted to be operatively connected with and disconnected from said keys to effect actuation of the product plates corresponding to the figures of the multiplicand.

15. In a calculating machine, multiplying devices corresponding to the numerals 1 to 9, item mechanism comprising members adapted to be set to represent a plural-figure item and adapted also to coöperate with said multiplying devices and ten numeral keys representing the numerals 0 to 9 and adapted to set said members in position to represent such plural-figure item and when in such position to coöperate with the multiplying devices.

16. In a calculating machine, multiplying devices corresponding to the numerals 1 to 9, a movable carriage, members mounted in said carriage and adapted to be set to coöperate with the multiplying devices, and ten figure keys corresponding to the numerals 0 to 9 to move the carriage and to set said members in position to coöperate with the multiplying devices.

17. In a calculating machine, totalizing mechanism, actuating devices for the totalizing mechanism, product plates designed to be operatively connected to the actuating devices to control the movement thereof, and normally out of operative connection therewith, and a movable carriage, means in said carriage to establish operative connection between the product plates and the actuating devices.

18. In a calculating machine, totalizing mechanism, actuating devices for the totalizing mechanism, product plates designed to be operatively connected to said devices and being normally out of operative connection with said devices, members movably mounted in a carriage, and means to move said carriage and to set said members in position to establish operative connection between the actuating members and the product plates.

19. In a calculating machine, multiplying devices comprising product plates corresponding to the numerals 1 to 9, members adapted to be set to represent a plural-figure multiplicand and to be set into coöperative relation with the product plates corresponding to the figures of the multiplicand, and ten figure keys corresponding respectively to the numerals 0 to 9 to set the multiplicand members.

20. In a calculating machine, multiplying devices corresponding to the numerals 1 to 9, members adapted to be set to coöperate with the multiplying devices, ten numeral keys corresponding to the numbers 0 to 9 each having means operatively connected thereto to set any one or more of said members in coöperative relation to the multiplying devices so that a member is set to coöperate with the particular multiplying device that has the same number as the key operated.

21. In a calculating machine, multiplying devices corresponding to the numerals 1 to 9, an item register comprising members adapted to be set to represent a plural-figure item and thereby be set into coöperative relation with the multiplying devices, ten figure keys corresponding to the numerals 0 to 9, and means operatively connected to the figure keys to set said members to represent such item and thereby set said members into coöperative relation with the multiplying devices corresponding to the number of the key operated.

22. In a calculating machine, multiplying devices corresponding to the numerals 1 to 9, a movable carriage, members movably mounted in said carriage and adapted to be set to coöperate with the multiplying devices, ten numeral keys corresponding to the numerals 0 to 9 having means operatively connected thereto to move the carriage and to set said members in coöperative relation with the multiplying devices corresponding to the numerals of the keys operated.

23. In a calculating machine, multiplying devices corresponding to the numerals 1 to 9, a movable carriage, members movably mounted in said carriage and adapted to be set to coöperate with the multiplying devices, numerals keys corresponding to the numerals 1 to 9 having means operatively connected thereto to move the carriage and to set said members in coöperative relation with the multiplying devices corresponding to the numerals of the keys operated, and a key corresponding to the numeral 0 having means operatively connected thereto to move the carriage.

24. In a calculating machine, multiplying devices corresponding to the numerals 1 to 9, a carriage adapted to be moved step by step, members movably mounted in said carriage and adapted to be moved and set in proportion to the figures of an item, figure keys having means operatively connected thereto to move and set said members and to move said carriage step by step to thereby set said members in position to coöperate with the multiplying devices corresponding in number to the numbers of the keys operated.

25. In a calculating machine, multiplying devices corresponding to the numerals 1 to 9, an item register comprising a movable carriage, item members in said carriage adapted to be moved and set in proportion to the figures of an item, members movably mounted on said item members and adapted to be set to coöperate with the multiplying devices, figure keys having means operatively connected thereto to move and set said item members to represent an item and thereby set said second members in position to coöperate with the multiplying devices corresponding to the numerals of the keys operated and represented by the item members.

26. In a calculating machine, multiplying devices comprising product plates corresponding to the numerals 1 to 9, an item register comprising a movable carriage, item members in said carriage adapted to be moved and set in proportion to the figures of an item, members movably mounted on said item members and adapted to be set into position to coöperate with the product plates, figure keys having means operatively connected thereto to move and set said item members to represent an item and to move said carriage step by step from normal position to thereby set said second members into position to coöperate with the product plates corresponding to the figures of the item represented by the item members.

27. In a calculating machine, totalizing mechanism multiplying devices, item mechanism comprising members adapted to be set to represent a plural-figure item and to coöperate with the totalizing mechanism and the multiplying devices, and ten numeral keys adapted to set said members in such position to coöperate with the totalizing mechanism and the multiplying devices.

28. In a calculating machine, totalizing mechanism, multiplying devices corresponding to the numerals 1 to 9, a movable carriage, members mounted in said carriage and adapted to be set to coöperate with the totalizing mechanism and with the multiplying devices, and ten figure keys corresponding to the numerals 0 to 9 for moving the carriage and setting the members to coöperate with the totalizing mechanism and the multiplying devices.

29. In a calculating machine, ten numeral keys corresponding to the numerals 0 to 9, an item register, multiplying devices, totalizing mechanism, and means adapted to be operatively connected to the numeral keys to actuate said register to thereby establish operative connection between the multiplying devices and the totalizing devices.

30. In a calculating machine, ten numeral keys corresponding to the numerals 0 to 9, an item register comprising item members adapted to be moved and set in proportion to the figures of an item, multiplying devices corresponding to the numerals 1 to 9, totalizing mechanism, and means adapted to be operatively connected to the numeral keys to actuate the register and set the item members to represent an item and thereby establish operative connection between the multiplying devices corresponding to the figures of the item registered and the totalizing mechanism.

31. In a calculating machine, ten numeral keys, an item register comprising item members adapted to be moved and set in proportion to the figures of an item, members movably mounted on said item members, multiplying devices corresponding to the numerals 1 to 9, totalizing mechanism, and means adapted to be operatively connected to the numeral keys to actuate the register to set the item members to represent the item, and thereby set said movable members on the item members into coöperative relation with the multiplying devices corresponding to the figures of the item registered and into coöperative relation with the totalizing mechanism.

32. In a calculating machine, totalizing mechanism, actuating bars for the totalizing mechanism, product plates for controlling the movement of the actuating bars and corresponding to the numerals 1 to 9, and ten numeral keys representing the numerals 0 to 9 adapted to effect operative connection of any one of the product plates with a plurality of actuating bars.

33. In a calculating machine, totalizing mechanism, actuating bars for the totalizing mechanism, product plates corresponding to the numerals 1 to 9, ten keys each adapted to operatively connect one of the product plates with a number of actuating bars for governing the movement of the actuating bars by the movement of the product plates.

34. In a calculating machine, totalizing mechanism, actuating members for the totalizing mechanism, multiplying devices comprising product plates corresponding to the numerals 1 to 9, and each plate having a series of projections respectively proportionate to the tens and units part-products of the particular plate numeral multiplied by the digits 1 to 9, said plates being adapted to be operatively connected to and moved jointly with said actuating members for controlling the movement of the totalizing mechanism and ten numeral keys, nine of which are arranged to effect operative connection between a product plate and a plurality of actuating members.

35. In a calculating machine, totalizing mechanism, actuating devices for the totalizing mechanism, multiplying devices comprising product plates for controlling the movement of the actuating devices and corresponding to the numerals 1 to 9, ten numeral keys, nine of which are arranged to effect operative connection between a product plate and a plurality of actuating members, so that movement of the product plates compels movement of the actuating devices.

36. In a calculating machine, totalizing mechanism, actuating devices for the totalizing mechanism, multiplying devices comprising product plates for controlling the movement of the actuating devices and corresponding to the numerals 1 to 9, and members adapted to be interposed between the product plates and the actuating devices for the totalizing mechanism to thereby establish operative connection between the product plates and the actuating devices and ten numeral keys, nine of which are arranged to set said members to effect operative connection between a product plate and a plurality of actuating members.

37. In a calculating machine, totalizing mechanism, actuating devices for the totalizing mechanism, multiplying devices comprising product plates for controlling the movement of the actuating devices and corresponding to the numerals 1 to 9, a movable carriage, members movably mounted in said carriage and adapted to be moved and set in proportion to the figures of an item to thereby represent a multiplicand and to be set in cooperative relation with the product plates of corresponding numbers to thereby establish operative connection between the product plates representing the figures of the multiplicand and the actuating devices for the totalizing mechanism.

38. In a calculating machine, product plates corresponding to the numerals 1 to 9, each plate having a series of projections proportionate to the tens and units part products of the plate numeral multiplied by the digits 1 to 9, means for moving each plate proportionately to the projections thereon, multiplying keys representing the digits 1 to 9, and means under control of each of the multiplying keys to effect two successive movements of the product plates upon a single actuation of a multiplying key.

39. In a calculating machine, product plates corresponding to the numerals 1 to 9, each plate having a series of projections proportionate to the tens and units part products of the plate numeral multiplied by the digits 1 to 9, means for moving each plate proportionately to the projections thereon; multiplying keys representing the digits 1 to 9, a series of members operatively connected to the multiplying keys and adapted to cooperate with the product plates to determine the extent of their movement, and means under control of each of the multiplying keys to effect two successive movements of the product plates upon a single actuation of a multiplying key.

40. In a calculating machine, product plates representing the numerals 1 to 9, and adapted to have movement proportionate to the tens and units part-products, nine figure keys representing the numerals 1 to 9, a driving mechanism common to all the product plates, and means under control of the figure keys to effect part-product movement of the product plates through said driving mechanism.

41. In a calculating machine, a totalizing mechanism, a multiplying mechanism adapted to actuate the totalizing mechanism, said mechanisms being normally out of operative connection, a series of numeral keys representing the numerals 0 to 9, means adapted to be operatively connected to said keys to operatively connect said mechanisms and means adapted to be operatively connected to said keys to actuate the multiplying devices.

42. In a calculating machine, multiplying devices comprising product plates corresponding to the numerals 1 to 9 and adapted to have differential movement, multiplying keys corresponding to the numerals 1 to 9, a series of members under control of the multiplying keys and adapted to cooperate with all the product plates to control the extent of their movement, a driving mechanism for the multiplying devices, said driving mechanism being normally disconnected, and means operatively connected to each of the multiplying keys to connect the driving mechanism and to effect cooperation of the product plates with the particular ones of said members which are under control of the key operated.

43. In a calculating machine, multiplying devices comprising product plates corresponding to the numerals 1 to 9 and adapted to have differential movement, multiplying keys corresponding to the numerals 1 to 9, a series of members under control of the multiplying keys and adapted to move the product plates, a driving mechanism for the multiplying devices, said driving mechanism being normally disconnected, and means operatively connected to each of the multiplying keys to connect the driving mechanism and to move the product plates through the particular ones of said members which are under control of the key operated.

44. In a calculating machine, multiplying keys corresponding to the numerals 1 to 9 adapted to be actuated in accordance with the figures of the multiplier, product plates corresponding to the numerals 1 to 9 and subject to selection for effective actuation to represent the figures of the multiplicand, and means adapted to be actuated by the multiplying keys to effect movement of the product plates proportionate in extent to the tens and units part products respectively.

45. In a calculating machine, product plates corresponding to the numerals 1 to 9 and normally in bodily alinement flatwise, figure keys representing the numerals 1 to 9, and means operatively connected to the figure keys to be actuated thereby and adapted to effect movements of the respective product plates in two stages for each actuation of a figure key, said movements varying with the respective product plates, and the first stage of the movement of a given product plate corresponding in extent to the tens part-product of the plate number multiplied by the number of the key operated, and the second stage corresponding in extent to the units part-product of the plate number multiplied by the number of the key operated.

46. In a calculating machine, product plates corresponding to the numerals 1 to 9 differentially movable and adapted to be selected for effective operation to correspond to the figures of the multiplicand, ten multiplicand figure keys corresponding to the numerals 0 to 9 adapted to select the respective product plates to correspond to a plural-figure multiplicand, nine multiplier keys corresponding to the numerals 1 to 9, and means controlled by the multiplier keys to produce effective operation of such of the product plates as represent the figures of the multiplicand.

47. In a calculating machine, multiplying devices, a movable carriage, members mounted in said carriage and being adapted to coöperate with the multiplying devices, means to move said carriage from normal position, and ten multiplying keys corresponding to the numerals 0 to 9 controlling the means to actuate the multiplying devices and to move the carriage toward normal position.

48. In a calculating machine, multiplying devices comprising multiplying keys, a movable carriage containing members adapted to coöperate with the multiplying devices, means to move the carriage from normal position into position to coöperate with the multiplying devices, means under control of the multiplying keys to move the carriage toward normal position and a lever to set the last mentioned means in ineffective position.

49. In a calculating machine, totalizing devices, multiplying devices to control the totalizing devices, an item mechanism designed to coöperate with the multiplying devices and the totalizing devices, and comprising a movable carriage, figure keys to move the carriage step by step in one direction, and multiplying keys controlling the means to move the carriage step by step in reverse direction.

50. In a calculating machine, totalizing mechanism, multiplying devices to control the totalizing mechanism, an item register adapted to coöperate with the multiplying devices and with the totalizing mechanism and comprising a movable carriage, figure keys representing the numerals 0 to 9, means adapted to be operatively connected with and disconnected from said figure keys to actuate the register and to move the carriage step by step in one direction, and means adapted to be operatively connected with and disconnected from said figure keys to actuate the multiplying devices and to move the carriage step by step in reverse direction.

51. In a calculating machine, totalizing mechanism, multiplying devices to control the totalizing mechanism, an item register adapted to coöperate with the multiplying devices and with the totalizing mechanism and comprising a movable carriage, figure keys representing the numerals 0 to 9, means adapted to be operatively connected with and disconnected from said figure keys to actuate the register and to move the carriage step by step in one direction, means adapted to be operatively connected with and disconnected from said figure keys to actuate the multiplying devices and to move the carriage step by step in reverse direction, and a lever to set the last mentioned means in ineffective position.

52. In a calculating machine, multiplying devices, an item register comprising a movable carriage containing members adapted to coöperate with the multiplying devices, means to move said carriage from normal position, means to move said carriage step by step toward normal position, and multiplying figure keys controlling said last-mentioned means.

53. In a calculating machine, multiplying devices, an item register comprising a movable carriage, members movably mounted in the carriage and adapted to be set to coöperate with the multiplying devices, figure keys having means operatively connected thereto to set the members and to move the carriage step by step in one direction, and separate figure keys having means operatively connected thereto to cause step by step movement of the carriage in reverse direction.

54. In a calculating machine, totalizing mechanism, actuating bars for the totalizing mechanism, product plates to control the movement of the actuating bars, an item register comprising a movable carriage, members movably mounted in the carriage and adapted to be moved and set individually and moved in unison with the carriage to establish operative connection of the product plates with the actuating bars for the totalizing mechanism, item figure keys to set said members and move the carriage step by step from normal position, and multiplying figure keys having means operatively connected thereto to cause actuation of the product plates and the actuating bars and to cause step by step movement of the carriage toward normal position.

55. In a calculating machine, multiplying devices comprising product plates, a movable carriage containing members adapted to coöperate with the product plates, a driving device for the product plates and adapted to be actuated for two successive actuations to complete a cycle, means to move said carriage in one direction to bring said members therein into position to coöperate with the product plates, and means operatively connected to the driving device to move said carriage step by step in reverse direction, said means being effective at the end of each first actuation of a cycle.

56. In a calculating machine, typewriter numeral keys, item mechanism comprising a laterally movable carriage, item members in said carriage adapted to be moved and set in proportion to the figures of an item, means adapted to be operatively connected to said numeral keys to move said carriage step by step from normal position and to set said item members into position to represent an item, multiplying devices and keys operatively connected thereto to actuate the multiplying devices, and means operatively connected to said keys to back-space said carriage step by step toward normal position.

57. In a calculating machine, a totalizing mechanism, actuating devices for the totalizing mechanism, product plates to control the actuating devices, said actuating devices and said product plates being normally out of operative connection, item mechanism comprising a laterally movable carriage, members movably mounted in said carriage and designed to establish operative connection between the actuating members and the product plates, and also adapted to be moved and set in proportion to the figures of an item, keys for moving the carriage step by step in one direction and for setting the members therein to thereby set them in position to establish operative connection between the product plates and the actuating devices, driving means to actuate the product plates and the actuating devices, multiplying keys to connect the driving means to actuate the product plates, and means connected to said driving means to back-space the carriage a step for every actuation of a multiplying key.

58. In a calculating machine, typewriter devices comprising a movable platen, typewriter keys to move the platen step by step from normal position, a back space key to back space the platen step by step to normal position, an item register comprising a movable carriage, and means adapted to be operatively connected to the typewriter back space key to move the item register carriage.

59. In a calculating machine, totalizing mechanism comprising total wheels representing the various decimal orders, actuating bars for the total wheels and corresponding to the decimal orders of the total wheels, multiplying devices comprising product plates, an item register comprising a movable carriage having means to establish coöperation of a desired number of actuating bars with the product plates, item figure keys to move the carriage in one direction, and multiplying figure keys to effect actuation of the product plates and of the actuating bars and having means operatively connected thereto to cause step by step movement of the carriage in reverse direction to thereby effect successive coöperation of the product plates with actuating bars of lower decimal order.

60. In a calculating machine, totalizing mechanism comprising total wheels representing the various decimal orders, a series of actuating bars for the total wheels and corresponding respectively to the decimal orders of the total wheels and adapted to have two successive actuations to complete one cycle; said two actuations being proportionate in extent to the tens and units part-products respectively, and means to actuate the actuating bars to effect actuation so that the part product movement resulting from the multiplication of a digit by a digit will move a bar representing a certain decimal order, proportionate to the tens part product and the bar representing the next lower decimal order, proportionate to the unit part product.

61. In a calculating machine, totalizing mechanism adapted to be set to be operated for multiplication or clearing, a series of total wheels adapted to be rotated in one direction for multiplication and in reverse direction for clearing, a series of actuating bars for the total wheels, multiplying keys corresponding to the numerals 0 to 9, and means operatively connected to the multiplying key corresponding to the numeral 1 to cause rotation of the total wheels in either direction for the purpose of multiplication or of clearing, according to the setting of the totalizing mechanism.

62. In a calculating machine, an item register mechanism, multiplying devices, totalizing mechanism adapted to be set for multiplying operation or for clearing operation, multiplying numeral keys adapted to effect actuation of the multiplying devices and actuation of the totalizing mechanism to thereby multiply a registered item into the totalizing mechanism, and means operative, upon operation of the number 1 multiplying key, to clear a registered item out of a totalizing mechanism that has been set for clearing operation.

63. In a calculating machine, totalizing mechanism comprising total wheels, actuating bars for the total wheels, multiplying devices having means to impart tens and units part product movement to the actuating bars, said actuating bars being divided into two series, means to move one of said series of actuating bars from normal position in one direction, means to move the other of said series of actuating bars in opposite direction to the movement of the bars of said first mentioned series, and means to operatively connect the total wheels with either of said series of actuating bars.

64. In a calculating machine, total wheels, actuating bars for the total wheels, multiplying devices having means to impart tens and units part product movement to the actuating bars, said actuating bars being divided into a series of actuating bars A and a series of actuating bars B and arranged in pairs of a bar A and a bar B, means to impart simultaneous and equal movement to the members of a pair of bars but in opposite directions, and means to operatively connect the total wheels to either of said series of actuating bars.

65. In a calculating machine, a plurality of totalizing mechanisms adapted to be actuated to add the tens and units part products of a multiplication, a series of actuating bars for the totalizing mechanisms and adapted to have two successive actuations respectively proportionate to the tens and units part products, and means to operatively connect any of said totalizing mechanisms at will with the actuating bars and transmit part product movement to the totalizing mechanism.

66. In a calculating machine, a plurality of totalizing mechanisms adapted to be arranged either for multiplication or division, and each comprising a series of total wheels, a series of actuating bars common to all the total wheels and adapted to have two successive actuations proportionate in extent to the tens and units part products, respectively, and means to simultaneously operatively connect one or more of the totalizing mechanisms with the actuating bars at will and transmit such part-product movement to the total wheels to thereby actuate them for multiplication or division according to the character of the totalizing mechanism in operative position.

67. In a calculating machine, a multiplying mechanism comprising tens and units part-product devices, a plurality of totalizing mechanisms and means to add part-product movement into any selected one of said totalizing mechanisms at will.

68. In a calculating machine, multiplying mechanisms comprising tens and units part-product devices, a plurality of totalizing mechanisms and means to add part-product movement simultaneously into a plurality of said totalizing mechanisms selected at will.

69. In a calculating machine, multiplying devices comprising tens and units part-product devices, a plurality of totalizing mechanisms of either adding or subtracting character and means to add or subtract part-product movement to or from any one of the various totalizing mechanisms selected at will.

70. In a calculating machine, a plurality of totalizing mechanisms arranged for addition and multiplication, a separate totalizing mechanism arranged for subtraction and division, and means to simultaneously actuate the totalizing mechanism arranged for division and one or more of the totalizing mechanisms arranged for multiplication.

71. In a calculating machine, a multitude of totalizing mechanisms adapted to be set to perform various operations such as addition, multiplication and clearing, or subtraction, division and entering; a series of total wheels in each totalizer mechanism, a series of actuating members common to all the totalizing mechanisms and adapted to be operatively connected to the total wheels of one or more of the totalizing mechanisms; means to set the totalizing mechanisms in position to perform the selected operation, and an indicator for each totalizing mechanism coöperating with markings to visually indicate the operation to which the respective totalizing mechanism is set.

72. In a calculating machine, totalizing mechanism, actuating members for the totalizing mechanism adapted to have two reciprocating movements for multiplying operation and to have a single reciprocating movement for clearing operation, a main drive shaft, means adapted to be operatively connected to the main drive shaft to impart two reciprocating movements to the actuating bars during a cycle, and means adapted to be operatively connected to the main drive shaft to impart a single reciprocating movement to the actuating members during a cycle.

73. In a calculating machine, a plurality of totalizing mechanisms, actuating members for the totalizing mechanisms, a clearing device for the totalizing mechanisms, means to set a totalizing mechanism in position to perform clearing operation and to set one or more of the other totalizing mechanisms in position to perform adding operation, and means to actuate the actuating members to thereby add a cleared-out total to one or more totalizing mechanisms.

74. In a calculating machine, a plurality of totalizing mechanisms of adding or subtracting character, actuating members for the totalizing mechanisms, means to set a totalizing mechanism in position to perform clearing operation and to set another totalizing mechanism in position to perform adding or subtracting operation, and means to actuate the actuating members to thereby add or subtract a cleared-out total to or from another totalizing mechanism.

75. In a calculating machine, a plurality of totalizers each adapted to be arranged for addition and multiplication or for subtraction and division at will, actuating bars common to all the totalizers, and a clearing device for the totalizers adapted to actuate the actuating bars, and means to connect and actuate one of the totalizers for clearing action and one or more of the others for adding or subtracting action at will.

76. In a calculating machine, a plurality of totalizing mechanisms adapted to add part-product movement; actuating bars common to all of the totalizing mechanisms and adapted to have tens and units part-product movement; means to set one or more of the totalizing mechanisms at will into coöperative relation with the actuating bars and means to actuate for part-product movement such of said actuating bars as the case may require and thereby transmit part-product movement simultaneously to one or more of the totalizing mechanisms at will.

77. In a calculating machine, typewriting devices comprising a laterally movable platen, totalizing mechanisms, multiplying devices, said mechanisms being normally out of operative connection; item mechanism comprising a laterally movable carriage adapted to be moved to thereby establish coöperation of the multiplying devices and the totalizing mechanism, and a key having means operatively connected thereto to simultaneously move said platen and the item carriage.

78. In a calculating machine, typewriting devices comprising a laterally movable platen, totalizing mechanism, item mechanism comprising a movable carriage and containing members adapted to be set to represent an item, and said carriage being adapted to be moved to bring said members therein into coöperative relation with said totalizing mechanism, and a special key having means operatively connected thereto to move the platen and the item carriage predetermined distances, the movement of the platen being variable at will.

79. In a calculating machine, typewriting devices comprising a laterally movable platen, multiplying devices, item mechanisms comprising a laterally movable carriage adapted to be moved for coöperation with the multiplying devices, and a key having means operatively connected thereto to move the platen and the item carriage predetermined distances.

80. In a calculating machine, typewriting devices comprising a laterally movable platen and a tabulating key operatively connected thereto to move the platen predetermined distances, totalizing mechanism, multiplying devices, item mechanism comprising a laterally movable carriage adapted to be moved to thereby establish operative connection between the item mechanism and the multiplying devices and also between the item mechanism and the totalizing mechanism, and a special tabulating key having means operatively connected thereto to actuate said first-mentioned tabulating key to thereby cause movement of the platen and simultaneously therewith to cause movement of the carriage to a predetermined extent.

81. In a calculating machine, multiplying mechanism, totalizing mechanism, actuating devices for the totalizing mechanism, item register mechanism comprising a movable carriage, typewriter keys representing the numerals 0 to 9 and having means operatively connected thereto to effect movement of the carriage step by step from normal position upon operation of a key to print to thereby establish coöperative relation of the multiplying mechanism with the actuating devices for the totalizing mechanism, and a special non-writing key, as 396, to also move the register carriage step by step from normal position to thereby establish coöperative relation of the multiplying devices with the actuating devices for the totalizing mechanism.

82. In a calculating machine, multiplying devices, an item register adapted to be set to represent an item and simultaneously therewith set certain members into position to coöperate with the multiplying devices, a series of numeral keys, means adapted to be operatively connected to the numeral keys to set the register and means adapted to be operatively connected to said keys to actuate the multiplying devices.

83. In a calculating machine, totalizing mechanism, multiplying mechanism, item mechanism comprising a movable carriage adapted to coöperate with the totalizing mechanism and the multiplying mechanism, figure keys to move the carriage step by step from normal position and a special key to move the carriage step by step toward normal position.

84. In a calculating machine, typewriting devices comprising a platen movable step by step in one direction, devices adapted to move the platen step by step in reverse direction, a back-space key adapted to actuate said devices, totalizing mechanism, multiplying devices, and an item register comprising a movable carriage adapted to coöperate with the multiplying devices and the totalizing devices, and means adapted to be operatively connected to the devices actuated by the typewriter back-space key to move the carriage step by step.

85. In a calculating machine, typewriting devices comprising a laterally movable platen adapted to be moved step by step in one direction by the typewriter keys and to be back-spaced step by step by a typewriter back-space key, totalizing mechanism, multiplying mechanism, item mechanism comprising a movable carriage adapted to be moved to coöperate with the totalizing mechanism and the multiplying mechanism, and means adapted to be operatively connected to the devices actuated by the typewriter back-space key to move the carriage step by step whenever said key is operated to back-space the platen.

86. In a calculating machine, typewriter numeral keys, an item register, multiplying devices, said typewriter numeral keys being normally out of operative connection with the item register and the multiplying devices, and a lever having means to operatively connect the typewriter numeral keys with the item register, or with the multiplying devices.

87. In a calculating machine, totalizing devices, multiplying devices to control the totalizing devices, an item mechanism designed to coöperate with the multiplying devices and the totalizing devices, and comprising a movable carriage, figure keys to move the carriage step by step in one direction, and multiplying keys controlling the means to move the carriage step by step in reverse direction, and a lever to set said means in ineffective position.

88. In a calculating machine, multiplying devices comprising product plates, a movable carriage containing members adapted to coöperate with the product plates, an actuating device for the product plates adapted to be actuated for two successive actuations to complete a cycle, means to move said carriage in one direction to bring said members therein into position to coöperate with the product plates, and means operatively connected to the actuating device to move said carriage step by step in reverse direction, said means being effective at the end of each first actuation of a cycle, and a lever to set said means in ineffective position.

89. In a calculating machine, multiplying devices, a movable carriage, members mounted in said carriage and adapted to be set to coöperate with the multiplying devices, figure keys to move the carriage and set the members to coöperate with the multiplying devices, and an operating bar controlling the means to reset the members and the carriage.

90. In a calculating machine, totalizing mechanism, item mechanism comprising a movable carriage, members adapted to be set to coöperate with the totalizing mechanism mounted in said carriage, a clearing device for the totalizing mechanism, a clearing key adapted to set the clearing device in position to be actuated, an operating bar, and means controlled by the operating bar to simultaneously actuate the clearing device and to re-set the movable carriage and the members therein.

91. In a calculating machine, item mechanism comprising a movable carriage, figure keys adapted to move said carriage from normal position, totalizing mechanisms comprising actuating members $152^a$ and $152^b$ for the totalizing mechanisms, an oscillatable frame 345, a spring shaft 346 in said frame, a series of levers 348 to move the actuating members, springs 347 connected to the actuating members and to the spring shaft, an operating lever 290, and means connected to the operating lever to oscillate the frame to thereby actuate the actuating members through levers and springs, and means connected to said operating lever to re-set the carriage to normal position.

Signed at St. Louis, Missouri, this 15th day of December, 1917.

RICHARD von REPPERT.